US012025146B2

(12) United States Patent
Lazari et al.

(10) Patent No.: US 12,025,146 B2
(45) Date of Patent: Jul. 2, 2024

(54) BLADE ROTOR AND FLUID WORKING MACHINE COMPRISING SUCH A ROTOR

(71) Applicant: FPZ S.p.A., Concorezzo (IT)

(72) Inventors: Andrea Lazari, Concorezzo (IT); Andrea Cattanei, Genoa (IT); Sergio Ettore Ferigo, Concorezzo (IT)

(73) Assignee: FPZ S.P.A., Concorezzo (IT)

( * ) Notice: Subject to any disclaimer, the term of this patent is extended or adjusted under 35 U.S.C. 154(b) by 254 days.

(21) Appl. No.: 17/261,953

(22) PCT Filed: Aug. 6, 2019

(86) PCT No.: PCT/IB2019/056682
§ 371 (c)(1),
(2) Date: Jan. 21, 2021

(87) PCT Pub. No.: WO2020/031082
PCT Pub. Date: Feb. 13, 2020

(65) Prior Publication Data
US 2021/0301830 A1 Sep. 30, 2021

(30) Foreign Application Priority Data
Aug. 8, 2018 (EP) .................................... 18188090
Jan. 23, 2019 (IT) ........................ 102019000001033

(51) Int. Cl.
*F04D 29/28* (2006.01)
*F01D 5/04* (2006.01)
(Continued)

(52) U.S. Cl.
CPC ............. *F04D 29/281* (2013.01); *F01D 5/04* (2013.01); *F01D 5/048* (2013.01); *F01D 5/10* (2013.01);
(Continued)

(58) Field of Classification Search
CPC ........ F04D 29/30; F04D 5/002; F04D 29/281; F04D 29/666; F04D 29/188;
(Continued)

(56) References Cited

U.S. PATENT DOCUMENTS 5,266,007 A * 11/1993 Bushnell ............... F04D 29/666 416/200 R
6,158,954 A 12/2000 Nabeshima et al.
(Continued)

FOREIGN PATENT DOCUMENTS

DE 44 21 604 C1 4/1995
EP 1 624 191 A1 2/2006

OTHER PUBLICATIONS

International Search Report Corresponding to PCT/IB2019/056682 mailed Nov. 14, 2019.
(Continued)

*Primary Examiner* — Peter J Bertheaud
(74) *Attorney, Agent, or Firm* — Finch & Maloney PLLC

(57) ABSTRACT

A fluid working machine comprises a rotor (7) with a blading (10) comprising 40 to 65 blades that radially project out of a body central and are suitably circumferentially offset on a plane normal to the axis of symmetry of the rotor, according to an appropriate spacing rule that can eliminate or appreciably attenuate the acoustic emission components that are mostly annoying to the human ear or at frequencies close to the resonance frequencies of other parts of the working machine.

12 Claims, 8 Drawing Sheets

(51) Int. Cl.

| | |
|---|---|
| ***F01D 5/10*** | (2006.01) |
| ***F01D 5/14*** | (2006.01) |
| ***F02M 37/04*** | (2006.01) |
| ***F04D 5/00*** | (2006.01) |
| ***F04D 13/06*** | (2006.01) |
| ***F04D 23/00*** | (2006.01) |
| ***F04D 29/18*** | (2006.01) |
| ***F04D 29/30*** | (2006.01) |
| ***F04D 29/42*** | (2006.01) |
| ***F04D 29/66*** | (2006.01) |

(52) U.S. Cl.

CPC ............... *F01D 5/14* (2013.01); *F01D 5/141* (2013.01); *F02M 37/048* (2013.01); *F04D 5/002* (2013.01); *F04D 13/06* (2013.01); *F04D 23/008* (2013.01); *F04D 29/188* (2013.01); *F04D 29/30* (2013.01); *F04D 29/4206* (2013.01); *F04D 29/666* (2013.01); *F05D 2240/303* (2013.01); *F05D 2260/96* (2013.01); *F05D 2260/961* (2013.01)

(58) Field of Classification Search

CPC .... F04D 23/008; F04D 13/06; F04D 29/4206; F02M 37/048; F05D 2260/961; F05D 2240/303; F05D 2260/96; F01D 5/048; F01D 5/141; F01D 5/14; F01D 5/04; F01D 5/10

See application file for complete search history.

(56) References Cited

U.S. PATENT DOCUMENTS

| | | | | |
|---|---|---|---|---|
| 6,345,951 | B1 | 2/2002 | Choi | |
| 6,514,036 | B2 * | 2/2003 | Marshall | F04D 29/281 415/206 |
| 9,599,126 | B1 * | 3/2017 | Sagher | F04D 29/666 |
| 10,138,903 | B2 * | 11/2018 | Uda | F04D 17/04 |

OTHER PUBLICATIONS

Written Opinion Corresponding to PCT/IB2019/056682 mailed Nov. 14, 2019.

* cited by examiner

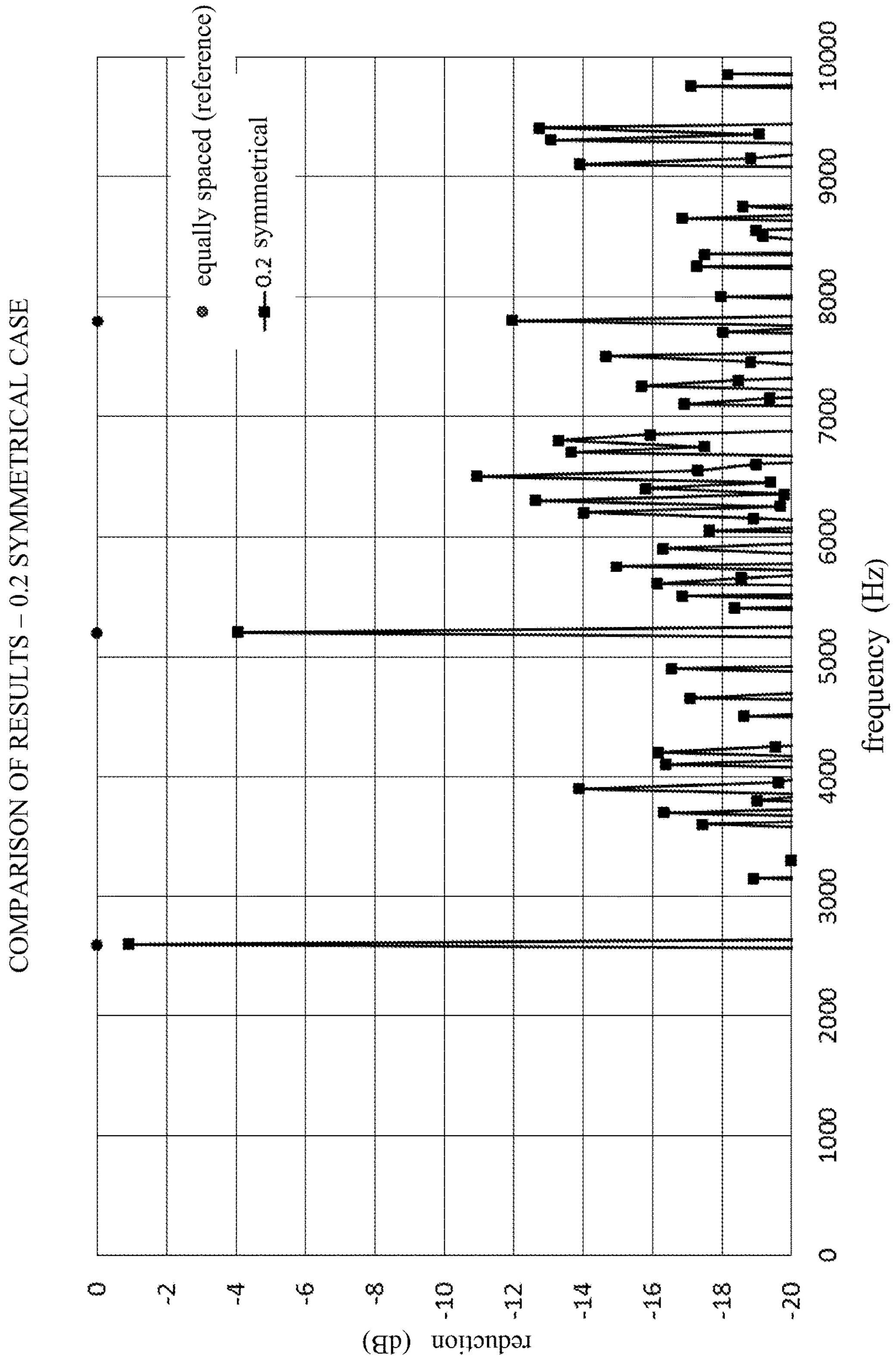
Figure 4 - Interference function for the case 0.2 symmetrical

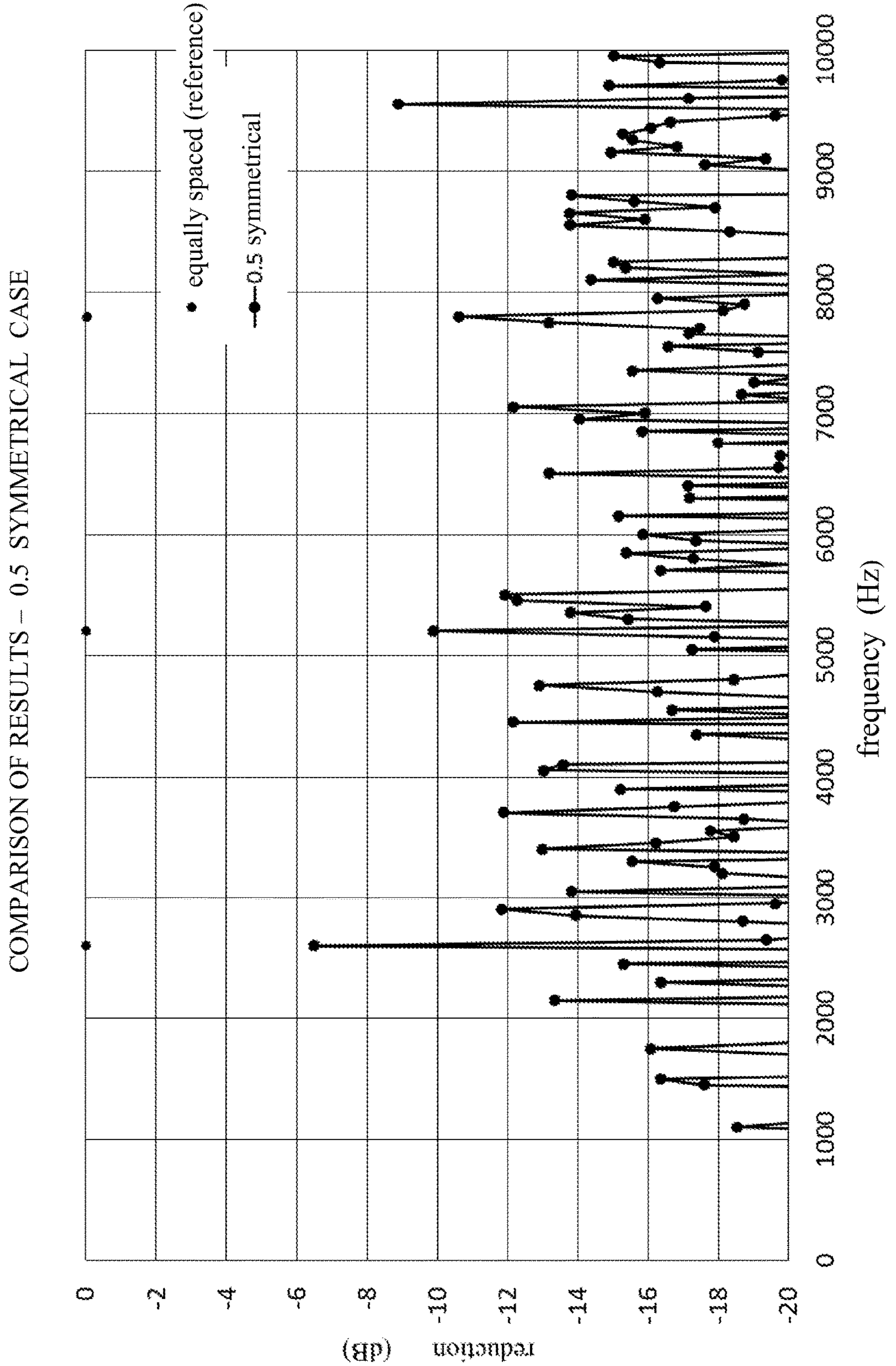
Figure 5 - Interference function for the case 0.5 symmetrical

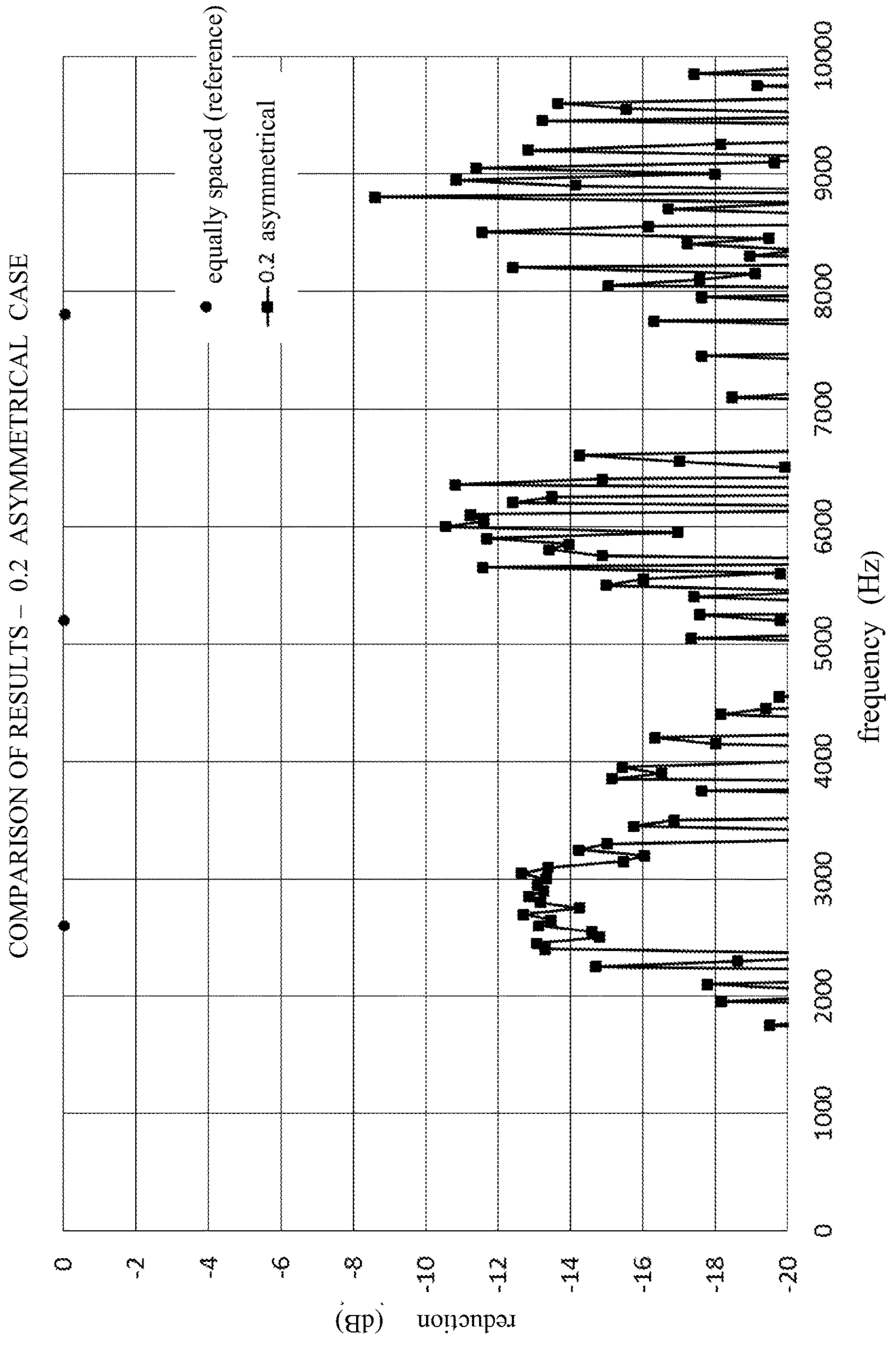
Figure 6 - Interference function for the case 0.2 asymmetrical

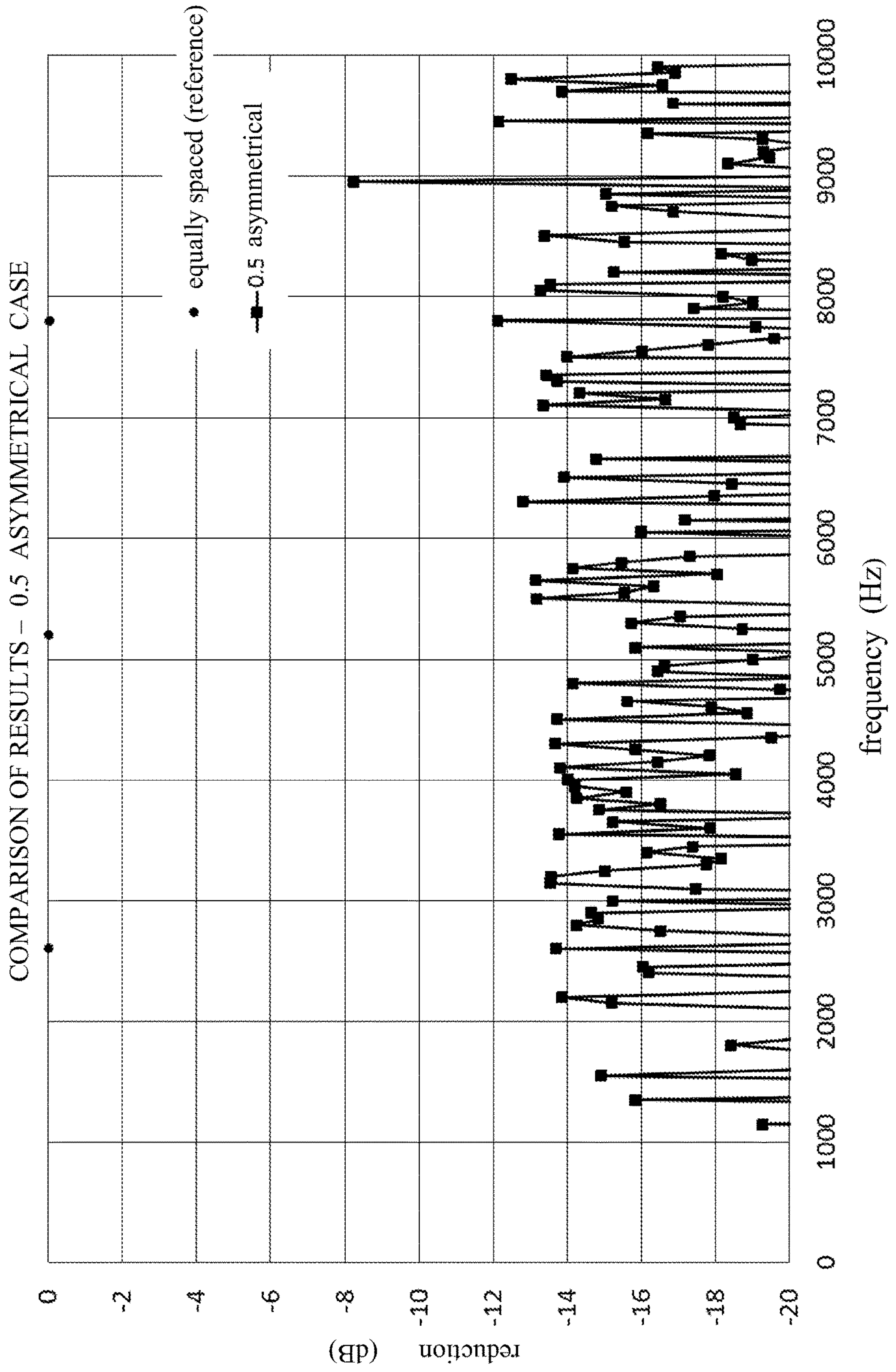
Figure 7 - Interference function for the case 0.5 asymmetrical

BLADE ROTOR AND FLUID WORKING MACHINE COMPRISING SUCH A ROTOR

FIELD OF THE INVENTION

The present invention relates to a blade rotor as defined in the independent claim, as well as a working machine comprising such rotor.

BACKGROUND OF THE INVENTION

The present invention relates to a blade rotor as defined in the preamble of claim 1, as well as a working machine comprising such rotor.

More particularly the present invention addresses a blade rotor for use in fluid blowers, such as side-channel blowers as disclosed in EP 1624191-B1, whose use is particularly advantageous, for example, to provide an airflow to a furnace or air change in a room.

BRIEF SUMMARY OF THE INVENTION

For simplicity, reference will be only made hereinbelow, by way of example and without limitation, to side-channel blowers and blade rotors used in these machines, but it should be noted that that the considerations as set forth below can also relate to general-purpose rotors having blades or other general elements such as polar pieces, recesses, teeth and the like.

Therefore, as used in the present invention, the term "blade rotor" shall be intended to relate not only to rotors having a plurality of blades but also rotors having a plurality of elements such as pole pieces, recesses, teeth and the like.

Likewise, as used in the present invention, the term "blade" shall be intended to relate not only to the blades of blowers, but also to general peripheral elements, such as blades of turbomachines of other type, pole pieces, teeth and the like.

Side-channel blowers may have a high performance for the use for which they are intended, but may cause an annoying noise. In particular, in these machines the noise has broadband components and tonal (or periodic) components, the latter often prevailing and being especially more annoying. It would be therefore desirable to reduce the importance of the aforementioned tonal components of noise, if not from the point of view of energy, from the point of view of perception, to reduce the nuisance of such noise.

The tonal noise is mainly caused by the presence of the plurality of blades of the rotor, which:

- are part of the rotor, or are rigidly mounted to the rotor, on a plane normal to the axis of rotation and
- are identical, in particular in terms of shape, mass and distance of the center of mass from the axis of rotation, considering that a space is necessarily provided between each pair of contiguous blades for the passage of air.

With Ω [rad/s] being the rotation speed of the rotor having m=1, . . . , z blades, each blade is assumed to interact (aerodynamically in case of blowers and turbomachines, and more generally also mechanically, electromagnetically, etc.) in an identical manner with stationary or rotating parts at an angular speed $\Omega_0$ [rad/s], with $\Omega_0 \neq \Omega$, which causes a tonal noise and/or vibrations having a fundamental frequency equal to $$f_1 = \frac{\Omega - \Omega_0}{2\pi}\text{[Hz]}$$

and harmonics $$f_n = nf_1, n = 1,2,3, \ldots \text{[Hz]}$$

Generally, the interaction which causes the generation of the tonal noise occurs with stationary parts and hence $\Omega_0=0$; therefore, the blade passing frequency is particularly important:

$$f_z = zf_1 = z\frac{\Omega}{2\pi}$$

Since this is a periodic phenomenon, the acoustic waves or vibrations generated by each blade add up to those generated by all the other elements according to the laws of interference that, at each harmonic, may be constructive or destructive according to the particular spacing rule between the various blades, the term "spacing" being intended to designate the angular position assumed by the z blades, i.e. the finite sequence of z values $$\alpha_m, m = 1, \ldots, z[°]$$

with $\alpha_m$ being measured about the axis of the rotor.

It will be understood that that the counter m, more properly the angle $\alpha_m$, may increase in the same or opposite direction relative to the axis of rotation, but, unless otherwise stated, it will be deemed to increase in the opposite direction, without loss of generality.

By convention, the angular position of the first blade assumed as a reference herein will be:

$$\alpha_1 = 0°.$$

Therefore, a spacing is defined by a sequence of z−1 values $$\alpha_m, m = 2, \ldots, z$$

In particular, a configuration is defined as equally spaced if:

$$\alpha_m \equiv \alpha_m^0 = (m-1)\Delta\alpha^0,$$

with $$\Delta\alpha^0 = \frac{360°}{z}.$$

What has been discussed above with reference to the blades of a rotor can also relate to more general elements m=1, . . . , z forming part of the rotor, or rigidly mounted relative to the rotor, at a plane normal to the axis of rotation.

Therefore there is a need for a rotor having a plurality m (m=1, . . . , z) of peripheral elements, in particular rotor blades, for use in working machines, namely side-channel blowers, which can afford high operation and efficiency performance given an amount of treated air, and also provides a reduction of the noise that can be perceived during operation of the operating machine.

This invention is based on the problem of providing a blade rotor, or other peripheral elements, for a working machine, which has such structural and functional characteristics as to fulfill the above need, while obviating the drawback associated with the presence of high-intensity tonal components, as mentioned with reference to the prior art.

This problem is solved by a blade rotor with a spacing as defined in the independent claims.

In another aspect, the problem is solved by a fluid working machine as defined in the independent claims.

BRIEF DESCRIPTION OF THE DRAWINGS

Further characteristics and advantages of the blade rotor and the working machine of the present invention will be apparent from the following description of a few preferred embodiments thereof, which is given by way of illustration and without limitation with reference to the accompanying figures, in which:

FIGS. 4 to 7 show diagrams to assess the effect of spacings used for the rotor blades;

DETAILED DESCRIPTION OF THE INVENTION

Figure 1:
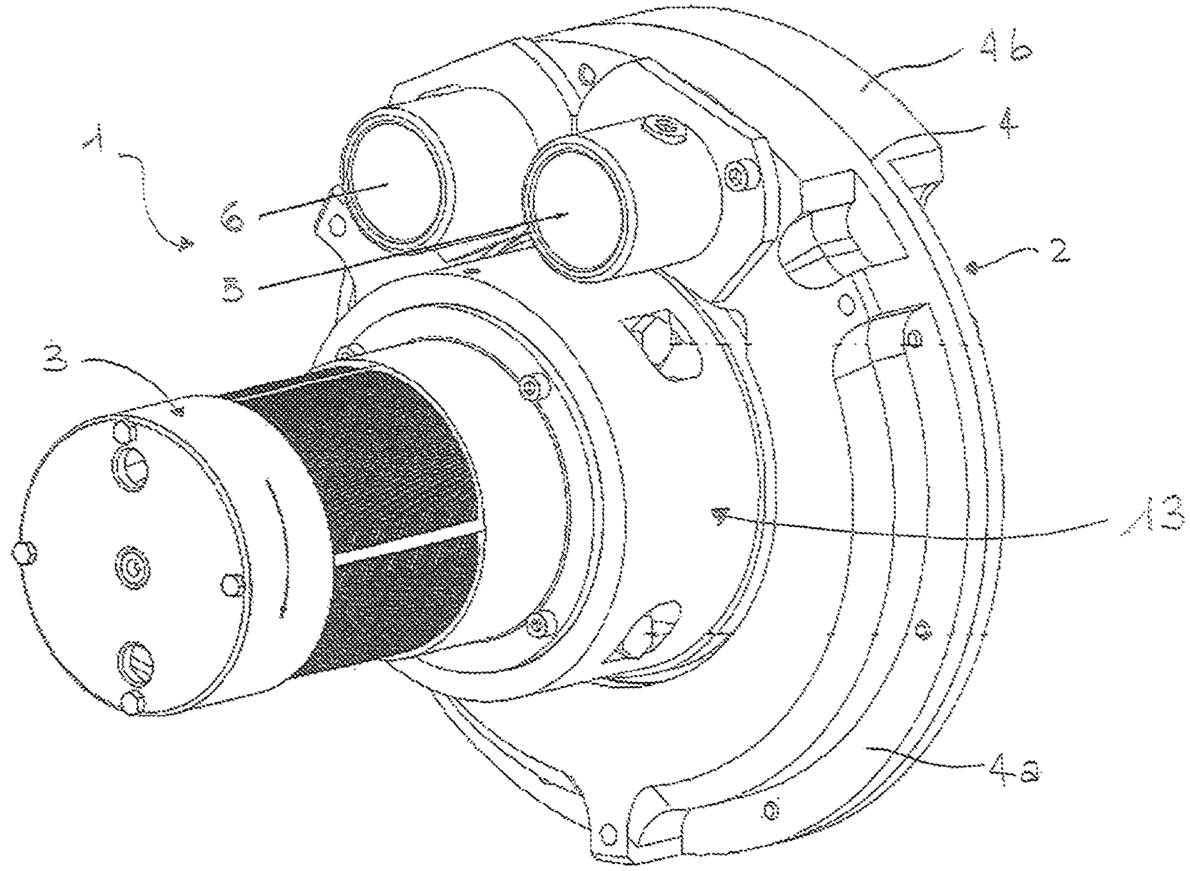
FIG. 1 shows a perspective view of the working machine of the invention.
Figure 2:
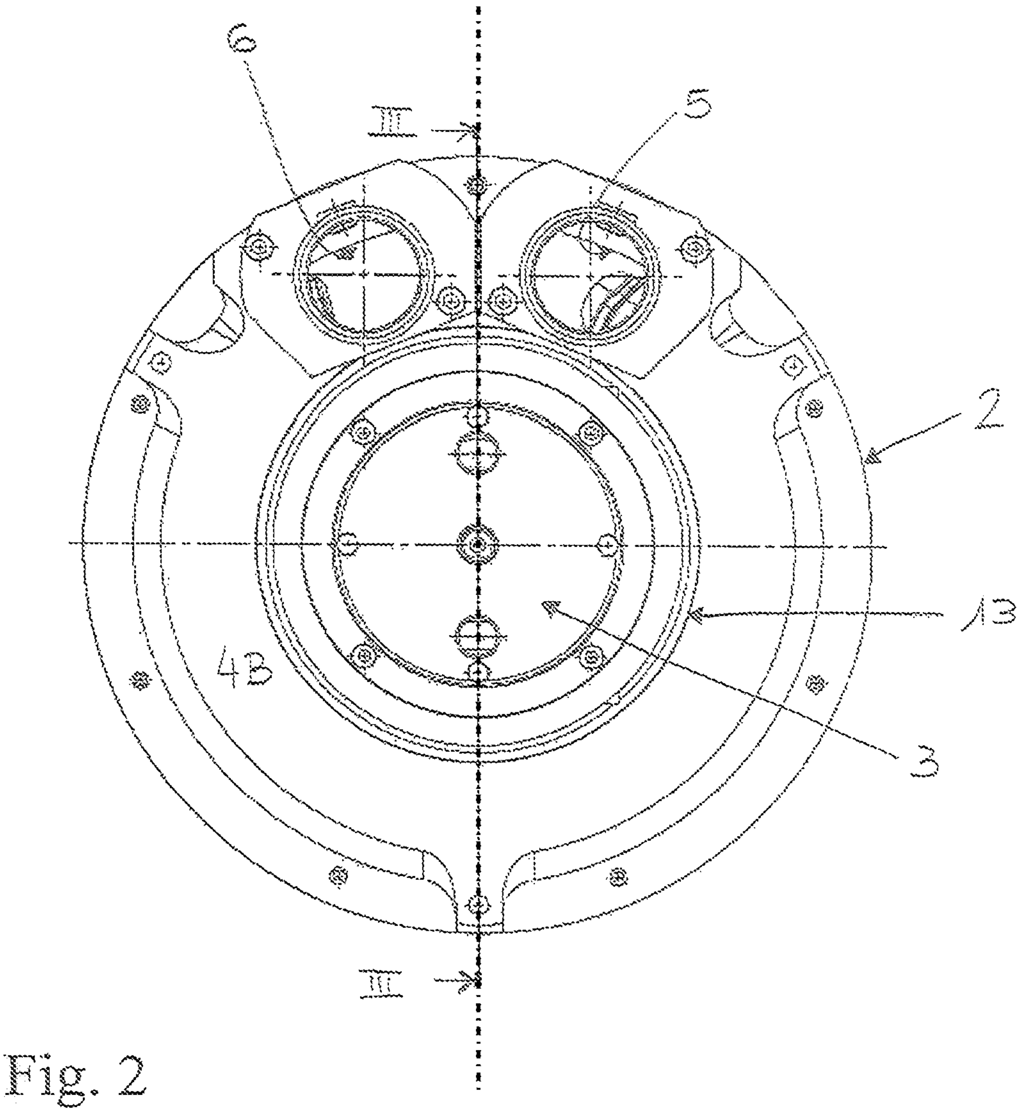
FIG. 2 shows a front plan view of the working machine of FIG. 1.
Figure 3:
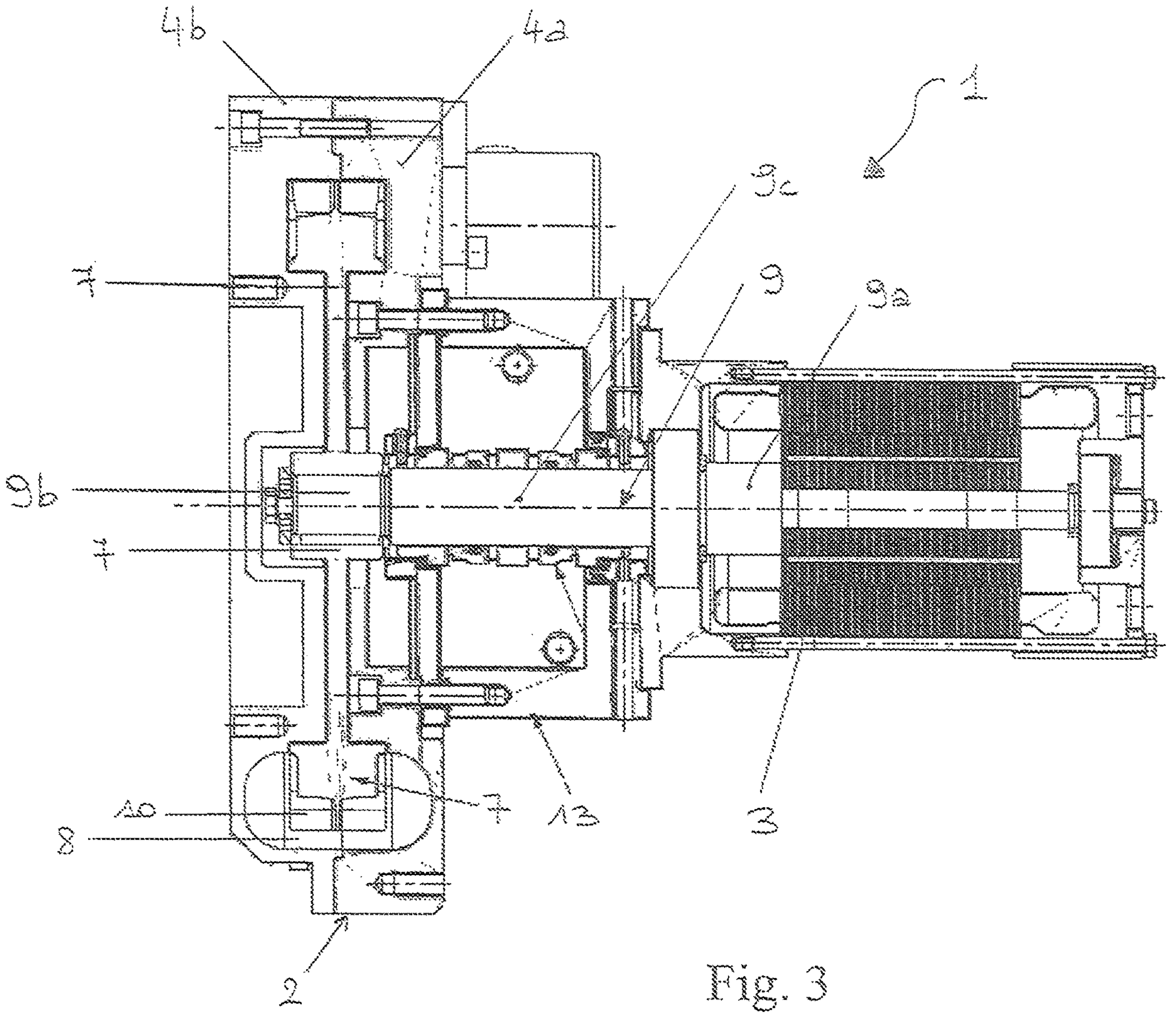
FIG. 3 is a sectional plan view as taken along the line III-III of FIG. 2.

Referring to the annexed figures, numeral 1 generally designates one embodiment of an operating machine, operating on gaseous fluids comprising a rotor of the invention.

According to the illustrated embodiment, the working machine 1 comprises a side-channel blower 2 driven by an electric motor 3.

In particular, the blower 2 comprises:

- a casing 4 defining a toroidal chamber 8 therein, having at least one inlet and one outlet for gaseous fluid; and
- a rotor 7 comprising a plurality of peripheral blades 10 projecting into said toroidal chamber 8, said rotor 7 being rotatably supported in the casing 4 of the blower by a portion 9*b* of a rotating shaft 9 having a first portion 9*a* projecting out of said casing 4 through a through opening provided for this purpose.

According to a preferred embodiment, the rotor 7 is double-bladed, i.e. comprises two distinct series of blades 10 arranged on two different planes perpendicular to the axis and close to each other. Preferably, the bladings of the double-bladed rotors are identical, which means that they are composed of the same number of equal blades 10 equally arranged with respect to the plane of symmetry with the same angular spacing rule.

Alternatively, rotors may be formed which comprise a single series of blades 10 or two series of blades 10 characterized by different angular spacing rules and/or with a different number of blades 10.

Furthermore, in certain embodiments with a double-bladed rotor, the rotor may be formed with a shape that divides the toroidal chamber into two independent toroidal channels, in which each of the two bladings projects.

The blower 2 also comprises a suction duct 5 and a delivery duct 6, in fluid communication with the inlet and the outlet of the toroidal chamber 8 respectively, via respective suction and discharge manifolds.

Preferably, the rotating shaft 9 and the drive shaft of the electric motor 3 are identified by the same rotating shaft 9 having:

- a first end portion 9*a*, which extends into the electric motor 3,
- an opposite end portion to 9*b* inserted in the casing 4 and
- an intermediate portion 9*c* which is external both to the casing 4 and to the motor 3.

The rotor 7 is rotatingly jointly supported, preferably keyed on the aforementioned opposite end portion to 9*b* of the shaft 9.

According to the illustrated embodiment, the rotor 7 comprises a central disk which projects out of a hub keyed on the end portion 9*b* of the shaft 9 toward a peripheral circle, along which the peripheral blades 10, here having a convex spoon shape, are placed.

As mentioned above, the peripheral blades 10 of the rotor 7 move inside the toroidal chamber 8 defined in the casing 4, between a body 4*a* and a cover 4*b* that is removably attached to the body 4*a*.

According to the illustrated embodiment, the working machine 1 comprises a box 13 placed around the intermediate portion 9*c* of the rotating shaft 9 to enclose in a protected position this intermediate portion 9*c* of the rotating shaft 9 in the box 13.

Coming now the rotor 7 in further detail, it shall be noted that the latter has been formed according to the invention with a radial arrangement of Z asymmetrical (or unequally circumferentially spaced) blades 10 instead of symmetrical (or circumferentially equidistant) blades.

According to a different embodiment, the rotor 7 comprises two bladings, one for each side, and the bladings of the two sides may have different numbers of blades 10 and/or different spacings.

As mentioned in the introduction to this disclosure, with $\Omega$ [rad/s] being the rotation speed of the rotor having m=1, . . . , z blades, each element, in the illustrated embodiment each blade 10, is assumed to interact (namely mechanically, aerodynamically, electromagnetically, etc.) in an identical manner with stationary or rotating parts at an angular speed $\Omega_0$ [rad/s], with $\Omega_0 \neq \Omega$, which causes a tonal noise and/or vibrations having a fundamental frequency equal to $$f_1 = \frac{\Omega - \Omega_0}{2\pi} \text{[Hz]}$$

and harmonics $$f_n = nf_1, n = 1,2,3, \ldots \text{[Hz]}$$

Of course, if interaction occurs with stationary parts of the blower 2, then $\Omega_0=0$ and the passing frequency $f_z$ of the element is of great importance.

$$f_z = zf_1 = z\frac{\Omega}{2\pi}$$

As mentioned above, since this is a periodic phenomenon, the acoustic waves or vibrations generated by each element add up to those generated by all the other elements according to the laws of interference that, at each harmonic, may be constructive or destructive according to the particular spacing rule between the various blades, the term "spacing"

being intended to designate the angular position assumed by the z blades, i.e. the finished sequence of z values $$\alpha_m, m=1, \ldots, z[°]$$

with $\alpha_m$ being measured about the axis of the rotor.

It shall be noted that that the counter m, i.e. the angle $\alpha_m$, may increase in the same or opposite direction relative to the axis of rotation, and, unless otherwise stated, the counter m, i.e. the angle $\alpha_m$, shall be intended hereinbelow to increase in a direction opposite to the direction of rotation of the rotor 7. Obviously, the directions of increase of the angle $\alpha_m$, i.e. the same as or opposite to the direction of rotation of the rotor is totally irrelevant, in both dynamic and acoustic terms.

Further, as discussed below, a specific blade 10 (i.e. a specific element) will be used as an angular reference. Therefore, its angular position is $\mu_1=0°$, whereby the spacing is defined by a sequence of z−1 values am, m=2, . . . , z representing the positions of the remaining z−1 blades 10.

The issue of tonal noise and vibrations, associated with the presence of the blades 10 will be now considered, as well as their interaction with the stationary parts through the fluid being treated, here air. As the rotor 7 rotates, each of the blades will emit a periodic acoustic wave, which is equal in shape and amplitude to the wave emitted by the reference blade, but offset by a time proportional to its angular position. The shape of this wave mainly depends on the geometry of the blade and the other parts of the machine, as well as the speed of rotation and the flow rate, but it is hardly affected by the angular distance between the blades.

As mentioned above, the emitted noise will result from the interference between the z waves emitted by the z blades, which will be described by means of the so-called interference function of the rotor, which depends on the spacing of the elements and may be exemplarily summarized in the following formula:

$$F_{int}(n) = \sqrt{\left[\sum_{m=1}^{z} \cos(n\alpha_m)\right]^2 + \left[\sum_{m=1}^{z} \sin(n\alpha_m)\right]^2}\ [-].$$

More precisely, the intensity of tonal component emitted from the rotor 7 will be determined, at the $n^{th}$ harmonic of the frequency of rotation, given by the expression $f_n=nf_1$, n=1,2,3, . . . [Hz], with $$f_1 = \frac{\Omega - \Omega_0}{2\pi}[\text{Hz}].$$

For this purpose, the amplitude of the wave emitted by a single blade at the same frequency $f_n$ shall be multiplied by the value of the interference function of the rotor $F_{int}(n)$ calculated at n. This will show that the spacing between the blades will cause the introduction of a kind of "filter" for analytically determinable characteristics.

Figure 8:
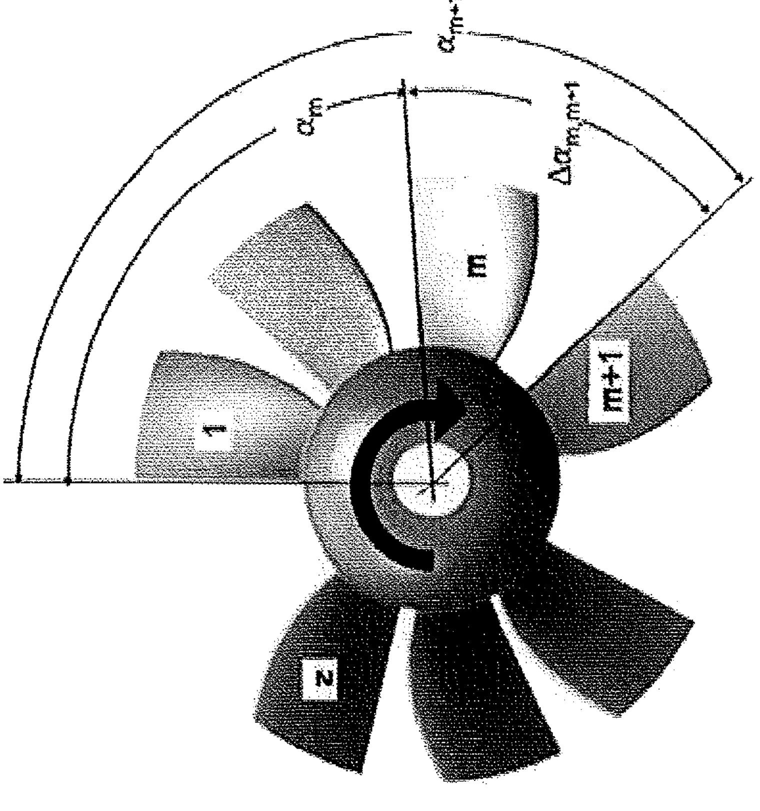
Fig. 8 Prior Art
FIG. 8 shows a schematic view of a rotor with a symmetrical/equally spaced arrangement of blades according to the prior art.

Thus, as shown by the Applicants, since the acoustic wave emitted by a single blade 10 *s* substantially independent from the spacing, the frequency distribution of the emitted energy may be changed by acting on the spacing, i.e. on the z−1 values $\alpha_m$, m=2, . . . , z. In particular, equally spaced rotors (see FIG. 8) are mainly characterized by a so-called comb-like interference function which completely deletes all tonal contributions except those at the harmonics of the blade passing frequency $f_z$, given by the expression $$f_z = zf_1 = z\frac{\Omega}{2\pi}$$

for which interference is constructive: these contributions are maximized, thereby resulting in the maximum possible value of the interference function $$F_{int}(n) = \begin{cases} z \text{ if } n = kz \\ 0 \text{ if } n \neq kz \end{cases}$$

of the rotor, which, at the frequency $f_z$ and its harmonics is equal to z. As a result, as compared with the single blade, the sound pressure level (SPL) of the tonal noise emitted by the rotor to the harmonics of the frequency $f_z$ is amplified by a factor equal to:

This phenomenon reduces the nuisance of the emitted noise, considering the sensitivity of the human ear to the tonal components of the perceived noise.

Unlike equally spaced rotors, with a given number of blades Z, non-equally spaced rotors may have an interference function with non-zero values at any harmonic of the rotation frequency, but generally lower than 20 $\log_{10}$ z. As a result, if the spacing is appropriately selected, it entails a reduction of the tones at $f_z$ and at its higher harmonics, and while it does not achieve full deletion of tonal components at the harmonics of $f_1$ but not multiple of $f_z$, it can generally reduce the nuisance of the tonal components perceived by a person.

It results from the foregoing that, once all design rules for affecting the interaction that causes the noise or vibrations have been implemented to minimize its occurrence, a further reduction of the tonal components (or vibrations) may be achieved by suitably acting upon the arrangement of the rotor elements, namely the blades 10 of the rotor 7. In particular, the purpose is to try and eliminate or at least appreciably attenuate the components that are mostly annoying to the human ear or possibly at frequencies close to the resonance frequencies of other parts of the system in which the rotor 7 of the side-channel blower 2 operates; this will afford a more favorable frequency distribution of the emitted energy. Then, considering that the most annoying components are those at the blade passing frequency and its harmonics, the purpose of any action on the spacing between the blades is that or reducing these more annoying components as compared with the equally spaced configuration.

Particularly referring to the acoustic emissions produced by the entire machine, it must also be considered that broadband acoustic emission components are also generally present, which are less annoying to the human ear as compared with tonal acoustic emission components. Furthermore, the aforementioned acoustic emission components may mask the tonal acoustic emission components and make them less troublesome or even unhearable.

For this reason, if the tonal components generated by non-equally spaced rotors at non-harmonic frequencies of the blade passing frequency are not too high (namely not too "prominent"), although contributing to the emitted acoustic power, they do not generally constitute a negative effect because they can be masked by broadband noise and do not invalidate the positive effect caused by the reduction of the blade passing frequency components.

As a result of the foregoing, the interference function of an equally-spaced rotor may be taken as a reference and comparison thereof with that of a rotor with the same number of blades z, but with a generic spacing can be useful to assess the benefit that can be obtained by the spacing of the latter, resulting from the change of the overall acoustic power relative to its frequency distribution.

Therefore, the solution to the problem of the aforementioned annoying tonal components may consist in optimizing the aforementioned interference function, wherein the variables to be processed are represented by the positions of the z−1 blades 10 of the illustrated example and the constraints are of fluid-dynamic, structural, technological nature, etc. and are represented by the distances between the contiguous blades of the rotor 7 of the working machine.

By way of example and without limitation, a too small distance between the blades may be deemed to cause excessive friction between the moving fluid and the blades, or cause processing or structural problems when a thickness decrease is required; likewise, an excessive distance between the blades may cause the fluid to be improperly guided by the blades, thereby decreasing the fluid-dynamic efficiency of the rotor.

In particular, after a number of experimental tests, the Applicants have found that a reduction of the tones at $f_z$ and at its higher harmonics increases with the increase of the unevenness of the spacing used for the blades 10 of the rotor 7, even when this is in conflict with the aforementioned constraints. Also, the Applicants also ascertained that even significant changes in the distance between successive blades do not significantly affect the performance of the rotor and the working machine.

According to a preferred embodiment, the rotor 7 is a rotor with a large number of blades 10, i.e. a number z of blades that is higher than or equal to forty and, preferably, lower than or equal to sixty-five, wherefore:

$40 \leq z \leq 65$, with z being the number of rotor blades.

In order to avoid overlaps and/or crossovers between contiguous blades, with reference to the angular position assumed by the z blades equal to $$\alpha_m, m=1, \ldots, z[°]$$

with $\alpha_m$ measured about the axis of the rotor, the two following conditions must be met $$\alpha_{m+1} > \alpha_m, m=1, \ldots, z-1$$

and $$\alpha_z < 360°;$$

whereby: $\alpha_{z+1} = \alpha_1 = 0°$.

For simplicity, the spacing rule adopted hereinafter will be the finite sequence of z−1 values that defines the distance between contiguous blades of a rotor (incremental, non-absolute, dimensioning), i.e. the angular amplitude of a space between two blades, assuming that the blades have a non-zero thickness in the tangential direction. Therefore, the spacing corresponds to (see FIG. 9):

$$\Delta\alpha_m = \alpha_{m+1} - \alpha_m, m=1, \ldots, z-1.$$

Considering the aforementioned conditions, in order to avoid overlaps and/or crossovers between contiguous blades, $\Delta\mu_m > 0°$, m=1, . . . , z must occur, with $\Delta\alpha_z$ not being an additional unknown quantity, as it corresponds to:

$$\Delta\alpha_z = 360° - \sum_{m=1}^{z-1} \Delta\alpha_m.$$

It will be also useful to introduce and consider a so-called non-uniformity factor that can quantify the relative deviation of a spacing rule with respect to an equally spaced arrangement:

$$x_m = \frac{\Delta\alpha_m}{\Delta\alpha^0} - 1, m = 1, \ldots, z$$

wherefore $$\Delta\alpha m = (1 + x_m)\Delta\alpha^0, m=1, \ldots, z.$$

where $\Delta\mu_0$ represents the angular spacing that can be found between two elements or blades in case of equal spacing $$\Delta\alpha^0 = \frac{360°}{z}.$$

It shall be noted that, relative to an equally spaced configuration (in which $x_m=0$ for any m):

- if $x_m<0$, then two contiguous blades (or elements) are closer, whereas
- if $x_m>0$, then two contiguous blades (or elements) are more distant from each other.

Then the maximum unevenness of a spacing rule is introduced, which is defined by the two quantities $$X_{min} = |\min_{m=1, \ldots, z}(x_m)| \text{ (minimum relative distance)}$$

and $$X_{max} = \max_{m=1, \ldots, z}(x_m) \text{(maximum relative distance)},$$

considering that the modulus was used in the expression of the minimum relative distance, because, as mentioned above, the quantity $\min_{m=1, \ldots, z-1}(x_m)$ is always negative for non-equally spaced rotors.

Therefore, for any non-equally spaced configuration, $X_{min}>0$ and $X_{max}>0$, whereas, for an equally spaced configuration, $X_{min}=X_{max}=0$, whereby, considering that:

$$\alpha_{m+1} > \alpha_m, m=1, \ldots, z-1,$$

in order to avoid overlaps and/or crossovers between contiguous blades of the rotor the following condition shall be simply met:

$$X_{min} < 1 \text{(i.e. } x_m > -1 \text{ for any } m).$$

This condition constitutes an exclusively geometric constraint, but it is also important to consider that in addition thereto, due to the aforementioned functional, structural or technological constraints, the angular distance $\Delta\alpha_m$ between any pair of contiguous elements may deviate from $\Delta\alpha_0$ to a lesser extent as compared to what would result from the condition $X_{min}<1$. This will necessarily be reflected in more restrictive conditions on $X_{min}$ as compared with the simple avoidance of crossovers between contiguous blades by $X_{min}<1$ and creates a constraint also on $X_{max}$.

The acceptable values $X_{min}$ and $X_{max}$ vary from case to case and may depend, for example, on the fluid dynamics of the particular machine instead of the technologies that are used to fabricate it, but the constraint on $X_{min}$ is certainly more restrictive. Since these values are not easily predictable beforehand, but result in any case from trade-offs between opposite design choices, spacing selection criteria will be indicated, depending on the value of $X_{min}$ that may be assigned by the designer in the whole range from 0 to 1. These constraints will be considered in the exemplary arrangements of the invention as set forth below.

It shall be noted that the rotor 7 comprises a large number of blades 10 ($z \geq 40$), whereby the rotor may be balanced either statically or dynamically, as needed, by adding masses or removing material, without affecting the functionality of the rotor.

Therefore, advantageously and unlike other cases, the sequences $$\alpha_m, m=1, \ldots, z[°]$$

and $$\Delta\alpha_m=(1+x_m)\Delta\alpha^0, m=1, \ldots, z-1$$

are not subject to balancing constraints.

It should also noted that for equally-spaced rotors having a large number of blades 10, the components at the first two harmonics of the blade passing frequency, i.e. $2f_z$ and $2f_z$, have a high intensity because the amplification factor value associated with the interference function is very high, and for example there will be $20 \log_{10} 40=16$ dB for a rotor with forty blades, therefore it would be essential to decrease the intensity by means of a suitable spacing between the elements based on the above discussed reasons. In addition, this should not excessively increase the components at the other harmonics of the rotation frequency. More precisely, the interference function should be minimized at the harmonics of the blade passing frequency $f_z$ but, at the same time, it should be kept sufficiently lower than the value z, i.e. the maximum theoretical value for the equally-spaced case, at all the other frequencies $f_n$, which are harmonics of the rotation frequency.

Input Data of Spacing Optimization Mode

The input data for the mode that was used to optimize rotor blade spacing are as follows:

- a number of blades z ranging from 40 to 65, and
- a minimum admitted distance value, i.e. the aforementioned $X_{min}$, within the range (0,1), with the extreme values 1 and 0 excluded because, as mentioned above, these extreme values lead to overlapping of contiguous blades or only allow the equally-spaced configuration. Therefore, there will be two options for the selection of $X_{max}$. In the simplest case, the maximum distance value is assumed to be equal to the minimum distance value, i.e.:

$$X_{max}=X_{min}$$

although the constraints on the maximum distance between the z blades of the rotor may be less restrictive than those on the minimum distance between the z blades of the rotor.

Thus, different values may be assigned to the two parameters $X_{min}$ and $X_{max}$, provided that $X_{max} \geq X_{min}$ and by assigning a proper function to obtain $X_{max}=f(X_{min})$, as better shown hereinafter.

In both cases, only $X_{min}$ will be assigned and an option must be made about how to determine $X_{max}$.

Double-Bladed Rotor

If the rotor is double-bladed, like in the case of the rotor 7 which has blades 10 on both sides, i.e. is two distinct series of blades mounted on two different planes perpendicular to the axis and close to each other, the following will be added the above conditions:

- the two bladings may be also composed of different numbers of blades, preferably differing by 1 or 2 blades;
- different spacing rules may be envisaged for each series;
- if the spacing rule is the same, the positions of the reference element (the one for which m=1) of each of the two series may be selected independently of each other, which means that they may be offset by any angle between 0° and 360°; alternatively, they may be offset by an angle other than $\Delta\alpha^0/2$, which is the most common case, or other than $(j+1/2)\Delta\alpha^0$, with j assuming any integer value;
- the counter m of each of the two series may increase in the same or opposite direction relative to the direction of rotation.

By these additional arrangements the residual spacing symmetries may be further broken, thereby decreasing the probability that blades may be located on the two sides in position for which acoustic interference would be constructive resulting in tonal components having a higher intensity.

Output Data of Spacing Optimization Mode

Figure 9:
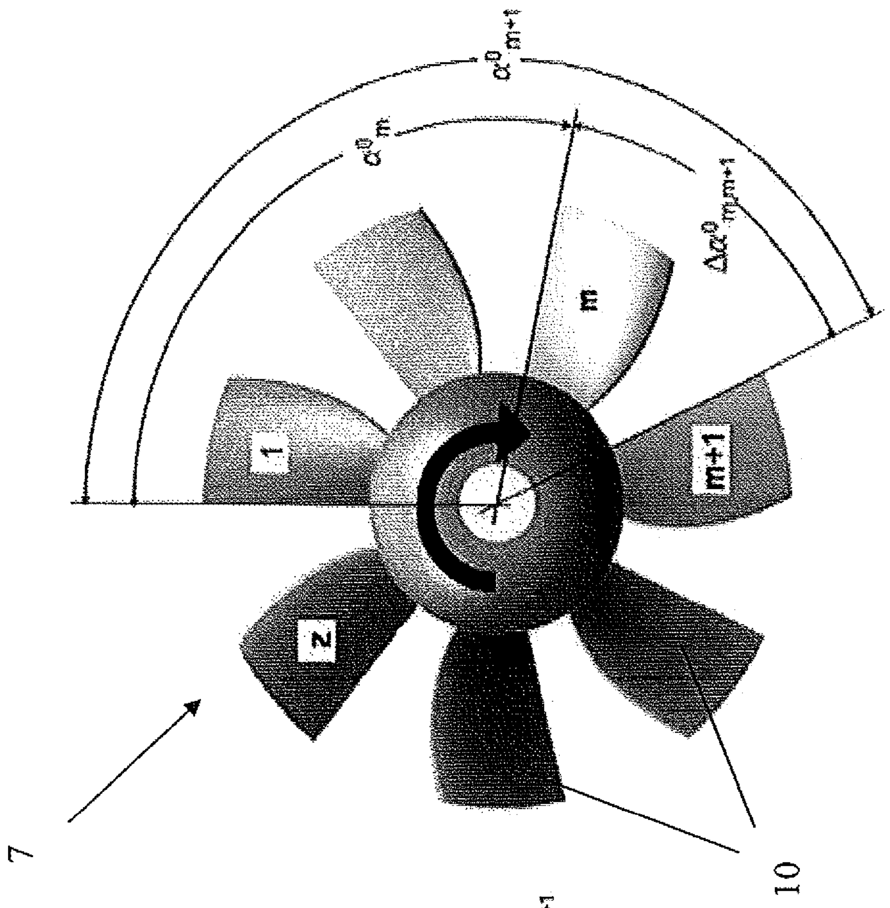
FIG. 9 shows a schematic view of a rotor with a non-symmetrical/nonequally spaced arrangement of blades.

With the angular position of the blade used as reference blade being, as discussed above, $\alpha_1=0°$, the output data obtained with the rotor blade spacing optimization mode are z−1 and correspond to a given sequence (see FIG. 9)

$$\Delta\alpha_m=\alpha_{m+1}-\alpha_m, m=1, \ldots, z-1$$

that has the characteristic of affording a real significant reduction of the noise and/or vibration components of the first two harmonics $f_z$ and $f_{2z}$, and at the same time without leading to excessive values of the tonal components of all the other harmonics of the rotation frequency $f_1$.

In other words, the aforementioned sequence provides the angular dimensions in incremental form of the z−1 elements of the rotor m=2, . . . , z, with the position of the first element ($\alpha_1=0°$) being taken as a reference.

Spacing Optimization Mode

Optimal Spacing is Determined by

1. Assigning the value of $X_{min}$ and then calculating $X_{max}$.

This is followed by calculating the extremes $\Delta\alpha_{min}$ and $\Delta\alpha_{max}$ of the range $\Delta\alpha_m$, compatible with the values of $X_{min}$ and $X_{max}$ and in doing so two possible alternative options I) and II) are considered, the former, known as "symmetrical" option, being more restrictive than the second, known as "asymmetrical":

I) it is assumed that $X_{max}=X_{min}$, or, alternatively

II) it is assumed that $$X_{max} = \frac{29}{11}X_{min} \quad \text{if} \quad 0 < X_{min} < 0.25$$

$$X_{max} = \frac{7}{3}X_{min} \quad \text{if} \quad 0.25 \leq X_{min} < 0.35$$

$$X_{max} = 2X_{min} \quad \text{if} \quad 0.35 \leq X_{min} < 0.45$$

$$X_{max} = \frac{8}{5}X_{min} \quad \text{if} \quad 0.45 \leq X_{min} < 1$$

In the light of the foregoing Admin and $\Delta\alpha_{max}$: may be determined by the following expressions:

$$\Delta\alpha_{min}=(1-X_{min})\Delta\alpha^0$$

$$\Delta\alpha_{max}=(1+X_{max})\Delta\alpha^0$$

2. Subsequently, the range $\Delta\alpha_{min}-\Delta\alpha_{max}$ is divided into i=1, 2, 3, . . . , 10 intervals whose amplitude is equal to $$\delta a = \frac{X_{max} + X_{min}}{10}\Delta\alpha^0$$

Provided that a number of elements ranging from a minimum $z_i^{min}$ to a maximum $z_i^{max}$ will fall in the $i^{th}$ interval, whose amplitude da results from the above expression; these numbers will be determined from the minimum and maximum percentages $p_i^{min}$ and $p_i^{max}$ based on the total number of elements minus one, i.e. z−1 (as mentioned above, the distance between the last two elements, i.e. z−1 and z, is obtained from the difference between 360° and the sum of the distances between the previous ones; alternatively, z−1 angular distances may be deemed to define the relative positions of z elements and to uniquely define the spacing rule):

$$z_i^{min}=\mathrm{int}((z-1)p_i^{min})$$

$$z_i^{max}=\mathrm{int}((z-1)p_i^{max})+1$$

It should be noted that, in order to avoid the possibility that $z_i^{min}$ and $z_i^{max}$ may be non-integer values, the function int( ) has been introduced into the above expressions for truncation, i.e. rounding down to the nearest integer.

The minimum $p_i^{min}$ and maximum $p_i^{max}$ percentage values are reported for four possible ranges of the values of $X_{min}$:

$$0<X_{min}<0.25$$

$$0.25\leq X_{min}<0.35$$

$$0.35\leq X_{min}<0.45$$

$$0.45\leq X_{min}<1,$$

in Table 1 (symmetrical spacing), for the aforementioned case I) in which $X_{max}=X_{min}$, and in Table 2 (preferred asymmetrical spacing) for the aforementioned case II) in which it is assumed that $X_{max}\neq X_{min}$.

in Table 3 (additional asymmetrical spacing) for the aforementioned case II) in which it is assumed that $X_{max}\neq X_{min}$,

TABLE 1 symmetrical spacing case I) with $X_{max} = X_{min}$

| i | Range | | $0 < X_{min} < 0.25$ | | $0.25 \leq X_{min} < 0.35$ | | $0.35 \leq X_{min} < 0.45$ | | $0.45 \leq X_{min} < 1$ | |
|---|---|---|---|---|---|---|---|---|---|---|
| | | | $p_i^{min}$ | $p_i^{max}$ | $p_i^{min}$ | $p_i^{max}$ | $p_i^{min}$ | $p_i^{max}$ | $p_i^{min}$ | $p_i^{max}$ |
| 1 | $\Delta\alpha_{min}$ | $\Delta\alpha^0 - 4\delta\alpha$ | 4.6% | 7.2% | 4.6% | 7.2% | 1.5% | 2.4% | 5.8% | 13.8% |
| 2 | $\Delta\alpha^0 - 4\delta\alpha$ | $\Delta\alpha^0 - 3\delta\alpha$ | 12.2% | 19.1% | 7.6% | 12.0% | 4.6% | 7.2% | 1.8% | 7.9% |
| 3 | $\Delta\alpha^0 - 3\delta\alpha$ | $\Delta\alpha^0 - 2\delta\alpha$ | 10.7% | 16.7% | 6.1% | 9.6% | 9.2% | 14.4% | 5.8% | 9.9% |
| 4 | $\Delta\alpha^0 - 2\delta\alpha$ | $\Delta\alpha^0 - \delta\alpha$ | 3.1% | 4.8% | 7.6% | 12.0% | 9.2% | 14.4% | 11.7% | 19.7% |
| 5 | $\Delta\alpha^0 - \delta\alpha$ | $\Delta\alpha^0$ | 10.7% | 16.7% | 10.7% | 16.7% | 10.7% | 16.7% | 13.7% | 21.6% |
| 6 | $\Delta\alpha^0$ | $\Delta\alpha^0 + \delta\alpha$ | 7.6% | 12.0% | 15.3% | 23.9% | 18.4% | 28.7% | 10.7% | 16.7% |
| 7 | $\Delta\alpha^0 + \delta\alpha$ | $\Delta\alpha^0 + 2\delta\alpha$ | 4.6% | 7.2% | 9.2% | 14.4% | 10.7% | 16.7% | 5.8% | 9.9% |
| 8 | $\Delta\alpha^0 + 2\delta\alpha$ | $\Delta\alpha^0 + 3\delta\alpha$ | 6.1% | 9.6% | 3.1% | 4.8% | 6.1% | 9.6% | 1.9% | 7.9% |
| 9 | $\Delta\alpha^0 + 3\delta\alpha$ | $\Delta\alpha^0 + 4\delta\alpha$ | 10.7% | 16.7% | 6.1% | 9.6% | 1.5% | 7.2% | 5.8% | 9.9% |
| 10 | $\Delta\alpha^0 + 4\delta\alpha$ | $\Delta\alpha_{max}$ | 7.6% | 12.0% | 7.6% | 12.0% | 6.1% | 9.6% | 5.8% | 13.8% |

TABLE 2 preferred asymmetrical spacing case II) with $X_{max} \neq X_{min}$

| i | Range | | $0 < X_{min} < 0.25$ | | $0.25 \leq X_{min} < 0.35$ | | $0.35 \leq X_{min} < 0.45$ | | $0.45 \leq X_{min} < 1$ | |
|---|---|---|---|---|---|---|---|---|---|---|
| | | | $p_i^{min}$ | $p_i^{max}$ | $p_i^{min}$ | $p_i^{max}$ | $p_i^{min}$ | $p_i^{max}$ | $p_i^{min}$ | $p_i^{max}$ |
| 1 | $\Delta\alpha_{min}$ | $\Delta\alpha^0 - 4\delta\alpha$ | 17.6% | 29.5% | 15.6% | 29.6% | 15.3% | 23.9% | 9.8% | 17.7% |
| 2 | $\Delta\alpha^0 - 4\delta\alpha$ | $\Delta\alpha^0 - 3\delta\alpha$ | 25.4% | 33.4% | 9.8% | 15.7% | 13.5% | 21.6% | 11.7% | 19.7% |
| 3 | $\Delta\alpha^0 - 3\delta\alpha$ | $\Delta\alpha^0 - 2\delta\alpha$ | 5.8% | 11.8% | 9.8% | 15.7% | 7.8% | 15.7% | 9.8% | 17.7% |
| 4 | $\Delta\alpha^0 - 2\delta\alpha$ | $\Delta\alpha^0 - \delta\alpha$ | 1.8% | 7.9% | 13.6% | 25.5% | 9.8% | 17.7% | 11.7% | 21.6% |
| 5 | $\Delta\alpha^0 - \delta\alpha$ | $\Delta\alpha^0$ | 3.9% | 9.9% | 9.8% | 15.7% | 7.6% | 15.7% | 5.8% | 13.8% |
| 6 | $\Delta\alpha^0$ | $\Delta\alpha^0 + \delta\alpha$ | 3.9% | 9.9% | 5.8% | 11.8% | 9.8% | 19.7% | 5.8% | 11.8% |
| 7 | $\Delta\alpha^0 + \delta\alpha$ | $\Delta\alpha^0 + 2\delta\alpha$ | 9.8% | 15.7% | 1.8% | 7.9% | 1.8% | 7.9% | 9.8% | 17.7% |
| 8 | $\Delta\alpha^0 + 2\delta\alpha$ | $\Delta\alpha^0 + 3\delta\alpha$ | 1.8% | 7.9% | 1.8% | 9.9% | 1.5% | 5.9% | 1.9% | 7.9% |
| 9 | $\Delta\alpha^0 + 3\delta\alpha$ | $\Delta\alpha^0 + 4\delta\alpha$ | 1.8% | 7.9% | 1.8% | 7.9% | 1.5% | 5.9% | 1.5% | 5.9% |
| 10 | $\Delta\alpha^0 + 4\delta\alpha$ | $\Delta\alpha_{max}$ | 1.8% | 5.9% | 1.8% | 9.9% | 1.5% | 5.9% | 1.5% | 5.9% |

TABLE 3

| additional asymmetrical spacing case II) with $X_{max} \neq X_{min}$ | | | | | | | | | | |
|---|---|---|---|---|---|---|---|---|---|---|
| | | | $0 < X_{min} <$ 0.25 | | $0.25 \leq X_{min} < 0.35$ | | $0.35 \leq X_{min} < 0.45$ | | $0.45 \leq X_{min} < 1$ | |
| i | Range | | $p_i^{min}$ | $p_i^{max}$ | $p_i^{min}$ | $p_i^{max}$ | $p_i^{min}$ | $p_i^{max}$ | $p_i^{min}$ | $p_i^{max}$ |
| 1 | $\Delta\alpha_{min}$ | $\Delta\alpha^0 - 4\delta\alpha$ | 22.7% | 28.3% | 21.4% | 29.6% | 15.3% | 23.9% | 10.7% | 16.7% |
| 2 | $\Delta\alpha^0 - 4\delta\alpha$ | $\Delta\alpha^0 - 3\delta\alpha$ | 26.2% | 32.6% | 9.9% | 13.6% | 13.8% | 21.5% | 12.2% | 19.1% |
| 3 | $\Delta\alpha^0 - 3\delta\alpha$ | $\Delta\alpha^0 - 2\delta\alpha$ | 8.7% | 10.9% | 9.9% | 13.6% | 9.2% | 14.4% | 10.7% | 16.7% |
| 4 | $\Delta\alpha^0 - 2\delta\alpha$ | $\Delta\alpha^0 - \delta\alpha$ | 3.5% | 4.4% | 18.1% | 25.0% | 10.7% | 16.7% | 12.2% | 19.1% |
| 5 | $\Delta\alpha^0 - \delta\alpha$ | $\Delta\alpha^0$ | 7.0% | 8.7% | 9.9% | 13.6% | 7.6% | 12.0% | 7.6% | 12.0% |
| 6 | $\Delta\alpha^0$ | $\Delta\alpha^0 + \delta\alpha$ | 7.0% | 8.7% | 8.2% | 11.4% | 12.2% | 19.1% | 6.1% | 9.6% |
| 7 | $\Delta\alpha^0 + \delta\alpha$ | $\Delta\alpha^0 + 2\delta\alpha$ | 12.2% | 15.2% | 3.3% | 4.5% | 4.6% | 7.2% | 10.7% | 16.7% |
| 8 | $\Delta\alpha^0 + 2\delta\alpha$ | $\Delta\alpha^0 + 3\delta\alpha$ | 1.8% | 4.4% | 1.8% | 4.5% | 1.5% | 4.5% | 1.5% | 4.8% |
| 9 | $\Delta\alpha^0 + 3\delta\alpha$ | $\Delta\alpha^0 + 4\delta\alpha$ | 1.8% | 4.4% | 1.8% | 4.5% | 1.5% | 4.5% | 1.5% | 4.8% |
| 10 | $\Delta\alpha^0 + 4\delta\alpha$ | $\Delta\alpha_{max}$ | 1.8% | 4.0% | 1.8% | 2.3% | 1.5% | 4.5% | 1.3% | 4.8% |

In short, for each of the two possible cases I) and II) as discussed above, the minimum and maximum percentage values $p_i^{min}$ and $p_i^{max}$ are determined in Tables 1, 2 and 3, for the total number of blades z that must be provided in an optimized arrangement in order to achieve the desired elimination or attenuation of the undesired tonal or vibration acoustic components. In all respects, Table 1, Table 2 and Table 3 show the respective rotor blade spacing criteria that must be met to achieve the desired effects.

APPLICATION EXAMPLES

The benefit that can be obtained by a suitable spacing rule is associated with the fact that many tonal components that are not too prominent, such as those typical of non-equally spaced rotors may be masked by the underlying broadband noise, and are thus less annoying than a few very prominent peaks, like in case of an equally spaced arrangement (regardless of the possible difference of the overall acoustic power). These characteristics may be assessed by analyzing the interference function diagram, according to the following criteria, as the SPL spectrum generated by the machine reflects the curve.

With specific reference to four specific spacings, the first two spacings obtained with the criteria of Table 1 (with $X_{Min}$=0.2 and 0.5) and the second two spacings obtained with the criteria of Table 3 (still with $X_{Min}$=0.2 and 0.5), with z=52 and Ω=314.2 rad/s, it is first noted that the rotation frequency $f_1$ is equal to 50 Hz and $f_z$=2600 Hz, $f_{2z}$=5200 Hz and $f_{3z}$=7800 Hz.

Now, with reference to these four possible spacings achieved according to the above criteria, the curves of the expression $20 \log_{10} F_{int}(n)/z$ (i.e. the values of the interference function normalized with z, which corresponds to the maximum possible value for the interference function, characteristic of the equally spaced configuration) for each of the four above-mentioned spacings with the values that can be achieved with an equally spaced configuration of the blades, for which $F_{int}(n)/z=1$ for n=z, 2z, 3z and $F_{int}(n)/z=0$ n≠z, 2z, 3z. Therefore, $20 \log_{10} F_{int}(n)/z=0$ or $-\infty$ in the two cases respectively.

Based on the foregoing:

the decibel values assumed by $20 \log_{10} F_{int}(n)/z$ at n=z, 2z, 3z represent the decrease of the tonal components at the harmonics of the blade passing frequency relative to the equally spaced configuration, i.e. the benefit obtained, and the decibel values assumed by $20 \log_{10} F_{int}(n)/z$ at all the other values of n provide an indication of the importance of the tonal components at the other harmonics of the rotation frequency generated by the non-equally spaced configuration and absent in the equally spaced configuration. More precisely, if for the non-equally spaced configuration some of these values exceed those at the harmonics of the rotation frequency, the corresponding tonal components emitted may also exceed those at the harmonics of the blade passing frequency; in this case, the benefit achieved as compared with the equally spaced configuration should be assessed with reference to the frequencies at which the interference function is maximum and no longer at the harmonics of the blade frequency. This situation may occur at high relative values of the relative non-uniformity of $X_{min}$ and $X_{max}$.

Table 4 below shows the angular values of each of the fifty-two rotor blades in the case of the equally spaced blade configuration, and in the first, second, third and fourth non-equally spaced configuration. The benefits that may be achieved using the aforementioned spacings are assessed according to the criteria as set out above.

TABLE 4

| spacings considered (angles expressed in [°]). | | | | | | | | | | | |
|---|---|---|---|---|---|---|---|---|---|---|---|
| Case | m= | 1 | 2 | 3 | 4 | 5 | 6 | 7 | 8 | 9 | 10 |
| equally spaced (reference) | $\alpha_m$= | 0.0 | 6.9 | 13.8 | 20.8 | 27.7 | 34.6 | 41.5 | 48.5 | 55.4 | 62.3 |
| 0.2 asymmetrical | $\alpha_m$= | 0.0 | 5.8 | 12.1 | 18.0 | 25.1 | 34.1 | 43.2 | 49.8 | 55.4 | 60.9 |
| 0.5 asymmetrical | $\alpha_m$= | 0.0 | 7.0 | 11.0 | 19.9 | 28 | 33.5 | 38.5 | 50.7 | 58.5 | 64.1 |
| 0.2 symmetrical | $\alpha_m$= | 0.0 | 8.0 | 14.0 | 21.0 | 27.0 | 34.0 | 42.0 | 48.0 | 56.0 | 63.0 |
| 0.5 symmetrical | $\alpha_m$= | 0.0 | 4.1 | 11.6 | 21.1 | 25.1 | 35.1 | 41.9 | 48.4 | 52.5 | 59.7 |

TABLE 4-continued spacings considered (angles expressed in [°]).

| | m= | 11 | 12 | 13 | 14 | 15 | 16 | 17 | 18 | 19 | 20 |
|---|---|---|---|---|---|---|---|---|---|---|---|
| equally spaced (reference) | $\alpha_m$= | 69.2 | 76.2 | 83.1 | 90 | 96.9 | 103.8 | 110.8 | 117.7 | 124.6 | 131.5 |
| 0.2 asymmetrical | $\alpha_m$= | 67.3 | 76.1 | 81.7 | 90.1 | 98.7 | 104.2 | 112.4 | 118.1 | 127.1 | 132.9 |
| 0.5 asymmetrical | $\alpha_m$= | 68.1 | 78.2 | 82.6 | 89.7 | 98.4 | 102.2 | 112.4 | 116.8 | 124.7 | 130.8 |
| 0.2 symmetrical | $\alpha_m$= | 70.0 | 77.0 | 83.0 | 90.0 | 97.0 | 105.0 | 111.0 | 118.0 | 124.0 | 132.0 |
| 0.5 symmetrical | $\alpha_m$= | 68.2 | 73.5 | 83.5 | 87.3 | 96.8 | 103.8 | 109.5 | 117.4 | 123.0 | 129.2 |

| | m= | 21 | 22 | 23 | 24 | 25 | 26 | 27 | 28 | 29 | 30 |
|---|---|---|---|---|---|---|---|---|---|---|---|
| equally spaced (reference) | $\alpha_m$= | 138.5 | 145.4 | 152.3 | 159.2 | 166.2 | 173.1 | 180 | 186.9 | 193.8 | 200.8 |
| 0.2 asymmetrical | $\alpha_m$= | 139.4 | 145.7 | 152.4 | 158.8 | 164.4 | 172.1 | 181.0 | 188.4 | 194.5 | 200.4 |
| 0.5 asymmetrical | $\alpha_m$= | 139.1 | 144.9 | 149.6 | 157.3 | 166.9 | 172.5 | 182.1 | 190.9 | 195.3 | 200.5 |
| 0.2 symmetrical | $\alpha_m$= | 138.0 | 145.0 | 153.0 | 159.0 | 166.0 | 174.0 | 180.0 | 188.0 | 194.0 | 201.0 |
| 0.5 symmetrical | $\alpha_m$= | 136.9 | 145.9 | 152.7 | 159.7 | 166.6 | 170.5 | 178.4 | 185.3 | 190.9 | 201.3 |

| | m= | 31 | 32 | 33 | 34 | 35 | 36 | 37 | 38 | 39 | 40 |
|---|---|---|---|---|---|---|---|---|---|---|---|
| equally spaced (reference) | $\alpha_m$= | 207.7 | 214.6 | 221.5 | 228.5 | 235.4 | 242.3 | 249.2 | 256.2 | 263.1 | 270 |
| 0.2 asymmetrical | $\alpha_m$= | 210.9 | 217.0 | 222.8 | 228.8 | 234.8 | 241.0 | 246.9 | 253.2 | 262.0 | 268.2 |
| 0.5 asymmetrical | $\alpha_m$= | 207.5 | 217.1 | 222.2 | 226.1 | 233.1 | 239.4 | 250.5 | 255.5 | 262.4 | 271.7 |
| 0.2 symmetrical | $\alpha_m$= | 208.0 | 215.0 | 221.0 | 229.0 | 236.0 | 243.0 | 249.0 | 257.0 | 263.0 | 271.0 |
| 0.5 symmetrical | $\alpha_m$= | 206.0 | 211.7 | 221.6 | 228.5 | 234.4 | 241.8 | 249.0 | 254.7 | 261.1 | 270.4 |

| | m= | 41 | 42 | 43 | 44 | 45 | 46 | 47 | 48 | 49 | 50 |
|---|---|---|---|---|---|---|---|---|---|---|---|
| equally spaced (reference) | $\alpha_m$= | 276.9 | 283.8 | 290.8 | 297.7 | 304.6 | 311.5 | 318.5 | 325.4 | 332.3 | 339.2 |
| 0.2 asymmetrical | $\alpha_m$= | 273.9 | 282.3 | 291.6 | 299.6 | 306.4 | 314.8 | 321.4 | 327.8 | 334.0 | 341.7 |
| 0.5 asymmetrical | $\alpha_m$= | 275.7 | 285.5 | 291.3 | 298.0 | 307.3 | 313.8 | 317.8 | 322.4 | 330.0 | 341.9 |
| 0.2 symmetrical | $\alpha_m$= | 276.0 | 285.0 | 290.0 | 299.0 | 305.0 | 312.0 | 318.0 | 325.0 | 333.0 | 340.0 |
| 0.5 symmetrical | $\alpha_m$= | 275.8 | 283.5 | 288.3 | 295.0 | 301.8 | 311.7 | 317.8 | 322.9 | 332.3 | 336.6 |

| | m= | 51 | 52 |
|---|---|---|---|
| equally spaced (reference) | $\alpha_m$= | 346.2 | 353.1 |
| 0.2 asymmetrical | $\alpha_m$= | 348.1 | 354.1 |
| 0.5 asymmetrical | $\alpha_m$= | 347.4 | 354.0 |
| 0.2 symmetrical | $\alpha_m$= | 347.0 | 353.0 |
| 0.5 symmetrical | $\alpha_m$= | 345.0 | 351.4 |

FIG. 4 shows the results achieved with a rotor blade arrangement according to the 0.2 symmetrical scheme of Table 4 as compared with the case of equally spaced blades.

It will be appreciated from FIG. 4 that, in the 0.2 symmetrical case there is a decrease of about 1 dB of the peak at the frequency $f_z$ and of about 4 dB at the frequency $f_{2z}$. The peak at the frequency $f_{3z}$ and those at harmonic frequencies of $f_z$, which are not found in the equally spaced case, are of less than 10 dB at the level of the original peaks of the equally spaced case and may be deemed as irrelevant.

FIG. 5 shows the results achieved with a rotor blade arrangement according to the 0.5 symmetrical scheme of Table 4 as compared with the case of equally spaced blades.

It will be appreciated from FIG. 5 that, in the 0.5 symmetrical case the strong non-uniformity has greatly changed the values of the interference function. Thus, the peak at the blade frequency $f_z$ was attenuated by about 6 dB and those at the harmonics $f_{2z}$ and $f_{3z}$, which are predominant in the case of FIG. 4, was attenuated by about 10 dB, while a peak attenuated by about 8.5 dB appeared at 9550 Hz. All the other peaks were attenuated by more than 10 dB.

FIG. 6 shows the results achieved with a rotor blade arrangement according to the 0.2 asymmetrical scheme of Table 4 as compared with the case of equally spaced blades.

It will be appreciated from FIG. 6 that, in the 0.2 asymmetrical case there is a decrease of 12 dB or more of the peaks at the frequencies $f_z$, $f_{2z}$ and $f_{3z}$, which are no longer the more prominent ones. The most prominent peak, albeit attenuated by about 8.5 dB, is the peak at 8800 Hz. Nine peaks have an attenuation ranging from 10 dB to 12 dB and the remaining peaks show an attenuation of more than 12 dB.

FIG. 7 shows the results achieved with a rotor blade arrangement according to the 0.5 asymmetrical scheme of Table 4 as compared with the case of equally spaced blades.

It will be appreciated from FIG. 7 that in the 0.5 asymmetric case all the peaks were attenuated by 12 dB or more, except the one at 8950 Hz, which was attenuated by approximately 8 dB, which value constitutes the minimum attenuation obtained with this spacing.

Concerning the detected dB attenuation values, it shall be noted that while a decrease of the order of 1 dB is moderate, a 5 dB decrease is significant and reductions of the order of 10 dB are very high, as they typically entail full masking, or at least a markedly reduced perception of the tonal components by broadband components. For this reason, in the 0.2 symmetrical case, the peaks at non-harmonic frequencies of $f_z$, arising as a result of the non-equal spacing not are intended to be of little or no importance as a contribution to nuisance. This proves that the above discussed symmetrical spacing rule ($X_{max}=X_{min}$) brings forth a significant benefit to noise quality because it improves the tonal component at $f_{2z}$ and makes that at $f_{3z}$ actually inaudible. Conversely, in the 0.5 symmetrical case the attenuation achieved are higher than those of the 0.2 symmetrical case (5 dB or more at the frequencies $f_z$, $f_{2z}$), even if the curves are qualitatively similar. In the 0.2 asymmetrical and 0.5 asymmetrical cases attenuations are quite significant and can completely change the characteristics of the perceived noise for the better, This also proves that, where possible, the asymmetrical rules are preferable in cases in which the most important constraint is the minimum distance between contiguous blades and the constraints on the maximum distance are not so stringent.

It can be appreciated from the foregoing that the arrangement of blades, or more generally elements, of the rotor, as well as the working machine comprising such a rotor, can fulfill the objects of the present invention, without affecting the efficiency or operation of the rotor and the working machine, as it was experimentally verified by a large number of tests.

Those skilled in the art will obviously appreciate that a number of changes and variants may be made to meet incidental and specific needs.

The invention claimed is:

1. A rotor of a fluid working machine comprising a central body with a first plurality of peripheral elements, extending radially therefrom, wherein:

the peripheral elements of said first plurality of peripheral elements are circumferentially arranged in offset positions on a plane normal to the axis of symmetry of the rotor;

said first plurality of peripheral elements comprises such a number Z of peripheral elements as to satisfy the following relation $40 \le Z \le 65$ and said Z peripheral elements are circumferentially arranged pitchwise around the central body of said rotor in an unequally spaced arrangement, resulting in $$\Delta\alpha_m = (1 + x_m)\Delta\alpha^0 \text{ with } m = 1, \ldots, z-1,$$

wherein:

$$\Delta\alpha^0 = \frac{360°}{z}$$

stands for the constant offset angle of an equally spaced arrangement;

$$x_m = \frac{\Delta\alpha_m}{\Delta\alpha^0} - 1$$

and m=1, . . . , z−1 constitute non-uniformity factors for quantifying the relative deviation of peripheral elements of the rotor with respect to an equally spaced arrangement, a minimum non-uniformity factor $X_{min} = |\min_{m=1, \ldots, z}(x_m)|$ and a maximum non-uniformity factor $X_{max} = \max_{m=1, \ldots, z}(x_m)$ can be found in said arrangement of said z peripheral elements of the rotor, corresponding to the minimum and maximum possible non-uniformity factors respectively, whereby a $\Delta\alpha_{min} = (1 - X_{min})\Delta\alpha^0$ and a $\Delta\alpha_{max} = (1 + X_{max})\Delta\alpha^0$ can be defined, corresponding to a minimum angular distance and a maximum angular distance that can be found in said distribution of said Z peripheral elements respectively, so that by dividing the range $\Delta\alpha_{min} - \Delta\alpha_{max}$ into i=1, 2, 3, . . . , 10 intervals having an equal amplitude of $$\delta\alpha = \frac{x_{max} + x_{min}}{10}\Delta\alpha^0,$$

the number of angular distances $\Delta\alpha_m$ between contiguous peripheral elements in the range $i_{-th}$ whose amplitude is $\delta\alpha$, ranges from a minimum: $z_i^{min} = \text{int}((z-1)p_i^{min})$ to a maximum: $z_i^{max} = \text{int}((z-1)p_i^{max}) + 1$ as determined from $p_i^{min}$ and $p_i^{max}$ which are minimum and maximum percentages and based on a total number of elements minus one, Z−1, where int(x) represents an integer part function and $p_i^{min}$ and $p_i^{max}$ are given by:

I) if $X_{max} = X_{min}$

| | | | $0 < X_{min} < 0.25$ | | $0.25 \le X_{min} < 0.35$ | |
|---|---|---|---|---|---|---|
| i | Range | | $p_i^{min}$ | $p_i^{max}$ | $p_i^{min}$ | $p_i^{max}$ |
| 1 | $\Delta\alpha_{min}$ | $\Delta\alpha^0 - 4\delta\alpha$ | 4.6% | 7.2% | 4.6% | 7.2% |
| 2 | $\Delta\alpha^0 - 4\delta\alpha$ | $\Delta\alpha^0 - 3\delta\alpha$ | 12.2% | 19.1% | 7.6% | 12.0% |
| 3 | $\Delta\alpha^0 - 3\delta\alpha$ | $\Delta\alpha^0 - 2\delta\alpha$ | 10.7% | 16.7% | 6.1% | 9.6% |
| 4 | $\Delta\alpha^0 - 2\delta\alpha$ | $\Delta\alpha^0 - \delta\alpha$ | 3.1% | 4.8% | 7.6% | 12.0% |
| 5 | $\Delta\alpha^0 - \delta\alpha$ | $\Delta\alpha^0$ | 10.7% | 16.7% | 10.7% | 16.7% |
| 6 | $\Delta\alpha^0$ | $\Delta\alpha^0 + \delta\alpha$ | 7.6% | 12.0% | 15.3% | 23.9% |
| 7 | $\Delta\alpha^0 + \delta\alpha$ | $\Delta\alpha^0 + 2\delta\alpha$ | 4.6% | 7.2% | 9.2% | 14.4% |
| 8 | $\Delta\alpha^0 + 2\delta\alpha$ | $\Delta\alpha^0 + 3\delta\alpha$ | 6.1% | 9.6% | 3.1% | 4.8% |
| 9 | $\Delta\alpha^0 + 3\delta\alpha$ | $\Delta\alpha^0 + 4\delta\alpha$ | 10.7% | 16.7% | 6.1% | 9.6% |
| 10 | $\Delta\alpha^0 + 4\delta\alpha$ | $\Delta\alpha_{max}$ | 7.6% | 12.0% | 7.6% | 12.0% |

| | $0.35 \le X_{min} < 0.45$ | | $0.45 \le X_{min} < 1$ | |
|---|---|---|---|---|
| i | $p_i^{min}$ | $p_i^{max}$ | $p_i^{min}$ | $p_i^{max}$ |
| 1 | 1.5% | 2.4% | 5.8% | 13.8% |
| 2 | 4.6% | 7.2% | 1.8% | 7.9% |
| 3 | 9.2% | 14.4% | 5.8% | 9.9% |
| 4 | 9.2% | 14.4% | 11.7% | 19.7% |
| 5 | 10.7% | 16.7% | 13.7% | 21.6% |
| 6 | 18.4% | 28.7% | 10.7% | 16.7% |
| 7 | 10.7% | 16.7% | 5.8% | 9.9% |
| 8 | 6.1% | 9.6% | 1.9% | 7.9% |
| 9 | 1.5% | 7.2% | 5.8% | 9.9% |
| 10 | 6.1% | 9.6% | 5.8% | 13.8%. |

II)

if $X_{max} \ne X_{min}$, with $$X_{max} = \frac{29}{11}X_{min} = \quad \text{if} \quad 0 < X_{min} < 0.25$$

$$X_{max} = \frac{7}{3}X_{min} \quad \text{if} \quad 0.25 \le X_{min} < 0.35$$

$$X_{max} = 2X_{min} \quad \text{if} \quad 0.35 \le X_{min} < 0.45$$

$$X_{max} = \frac{8}{5}X_{min} \quad \text{if} \quad 0.45 \le X_{min} < 1$$

by

| i | Range | | $0 < X_{min} < 0.25$ $p_i^{min}$ | $0 < X_{min} < 0.25$ $p_i^{max}$ | $0.25 \le X_{min} < 0.35$ $p_i^{min}$ | $0.25 \le X_{min} < 0.35$ $p_i^{max}$ |
|---|---|---|---|---|---|---|
| 1 | $\Delta\alpha_{min}$ | $\Delta\alpha^0 - 4\delta\alpha$ | 17.6% | 29.5% | 15.6% | 29.6% |
| 2 | $\Delta\alpha^0 - 4\delta\alpha$ | $\Delta\alpha^0 - 3\delta\alpha$ | 25.4% | 33.4% | 9.8% | 15.7% |
| 3 | $\Delta\alpha^0 - 3\delta\alpha$ | $\Delta\alpha^0 - 2\delta\alpha$ | 5.8% | 11.8% | 9.8% | 15.7% |
| 4 | $\Delta\alpha^0 - 2\delta\alpha$ | $\Delta\alpha^0 - \delta\alpha$ | 1.8% | 7.9% | 13.6% | 25.5% |
| 5 | $\Delta\alpha^0 - \delta\alpha$ | $\Delta\alpha^0$ | 3.9% | 9.9% | 9.8% | 15.7% |
| 6 | $\Delta\alpha^0$ | $\Delta\alpha^0 + \delta\alpha$ | 3.9% | 9.9% | 5.8% | 11.8% |
| 7 | $\Delta\alpha^0 + \delta\alpha$ | $\Delta\alpha^0 + 2\delta\alpha$ | 9.8% | 15.7% | 1.8% | 7.9% |
| 8 | $\Delta\alpha^0 + 2\delta\alpha$ | $\Delta\alpha^0 + 3\delta\alpha$ | 1.8% | 7.9% | 1.8% | 9.9% |
| 9 | $\Delta\alpha^0 + 3\delta\alpha$ | $\Delta\alpha^0 + 4\delta\alpha$ | 1.8% | 7.9% | 1.8% | 7.9% |
| 10 | $\Delta\alpha^0 + 4\delta\alpha$ | $\Delta\alpha_{max}$ | 1.8% | 5.9% | 1.8% | 9.9% |

| i | $0.35 \le X_{min} < 0.45$ $p_i^{min}$ | $0.35 \le X_{min} < 0.45$ $p_i^{max}$ | $0.45 \le X_{min} < 1$ $p_i^{min}$ | $0.45 \le X_{min} < 1$ $p_i^{max}$ |
|---|---|---|---|---|
| 1 | 15.3% | 23.9% | 9.8% | 17.7% |
| 2 | 13.5% | 21.6% | 11.7% | 19.7% |
| 3 | 7.8% | 15.7% | 9.8% | 17.7% |
| 4 | 9.8% | 17.7% | 11.7% | 21.6% |
| 5 | 7.6% | 15.7% | 5.8% | 13.8% |
| 6 | 9.8% | 19.7% | 5.8% | 11.8% |
| 7 | 1.8% | 7.9% | 9.8% | 17.7% |
| 8 | 1.5% | 5.9% | 1.9% | 7.9% |
| 9 | 1.5% | 5.9% | 1.5% | 5.9% |
| 10 | 1.5% | 5.9% | 1.5% | 5.9%. |

or alternatively by

| i | Range | | $0 < X_{min} < 0.25$ $p_i^{min}$ | $0 < X_{min} < 0.25$ $p_i^{max}$ | $0.25 \le X_{min} < 0.35$ $p_i^{min}$ | $0.25 \le X_{min} < 0.35$ $p_i^{max}$ |
|---|---|---|---|---|---|---|
| 1 | $\Delta\alpha_{min}$ | $\Delta\alpha^0 - 4\delta\alpha$ | 22.7% | 28.3% | 21.4% | 29.6% |
| 2 | $\Delta\alpha^0 - 4\delta\alpha$ | $\Delta\alpha^0 - 3\delta\alpha$ | 26.2% | 32.6% | 9.9% | 13.6% |
| 3 | $\Delta\alpha^0 - 3\delta\alpha$ | $\Delta\alpha^0 - 2\delta\alpha$ | 8.7% | 10.9% | 9.9% | 13.6% |
| 4 | $\Delta\alpha^0 - 2\delta\alpha$ | $\Delta\alpha^0 - \delta\alpha$ | 3.5% | 4.4% | 18.1% | 25.0% |
| 5 | $\Delta\alpha^0 - \delta\alpha$ | $\Delta\alpha^0$ | 7.0% | 8.7% | 9.9% | 13.6% |
| 6 | $\Delta\alpha^0$ | $\Delta\alpha^0 + \delta\alpha$ | 7.0% | 8.7% | 8.2% | 11.4% |
| 7 | $\Delta\alpha^0 + \delta\alpha$ | $\Delta\alpha^0 + 2\delta\alpha$ | 12.2% | 15.2% | 3.3% | 4.5% |
| 8 | $\Delta\alpha^0 + 2\delta\alpha$ | $\Delta\alpha^0 + 3\delta\alpha$ | 1.8% | 4.4% | 1.8% | 4.5% |
| 9 | $\Delta\alpha^0 + 3\delta\alpha$ | $\Delta\alpha^0 + 4\delta\alpha$ | 1.8% | 4.4% | 1.8% | 4.4% |
| 10 | $\Delta\alpha^0 + 4\delta\alpha$ | $\Delta\alpha_{max}$ | 1.8% | 4.0% | 1.8% | 2.3% |

-continued

| i | $0.35 \le X_{min} < 0.45$ $p_i^{min}$ | $0.35 \le X_{min} < 0.45$ $p_i^{max}$ | $0.45 \le X_{min} < 1$ $p_i^{min}$ | $0.45 \le X_{min} < 1$ $p_i^{max}$ |
|---|---|---|---|---|
| 1 | 15.3% | 23.9% | 10.7% | 16.7% |
| 2 | 13.8% | 21.5% | 12.2% | 19.1% |
| 3 | 9.2% | 14.4% | 10.7% | 16.7% |
| 4 | 10.7% | 16.7% | 12.2% | 19.1% |
| 5 | 7.6% | 12.0% | 7.6% | 12.0% |
| 6 | 12.2% | 19.1% | 6.1% | 9.6% |
| 7 | 4.6% | 7.2% | 10.7% | 16.7% |
| 8 | 1.5% | 4.5% | 1.5% | 4.8% |
| 9 | 1.5% | 4.5% | 1.5% | 4.8% |
| 10 | 1.5% | 4.5% | 1.3% | 4.8%. |

2. The rotor as claimed in claimed in claim 1, also comprising a second plurality of peripheral elements, said first plurality of peripheral elements and said second plurality of peripheral elements of said rotor being arranged on two different planes perpendicular to the axis of symmetry of the rotor, which are proximate to each other, wherein:

the peripheral elements of said second plurality of peripheral elements are circumferentially arranged in offset positions on a plane normal to the axis of symmetry of the rotor;

said second plurality of peripheral elements comprises such a number Z of peripheral elements as to satisfy the following relation; $40 \le Z \le 65$ and said Z peripheral elements of said second plurality of peripheral elements are circumferentially arranged pitchwise around the central body of said rotor in an unequally spaced arrangement, resulting in $$\Delta\alpha_m = (1+x_m)\Delta\alpha^0 \text{ with } m=1, \ldots, z-1,$$

wherein:

$$\Delta\alpha^0 = \frac{360^\circ}{z}$$

stands for the constant offset angle of an equally spaced arrangement;

$$x_m = \frac{\Delta\alpha_m}{\Delta\alpha^0} - 1$$

and $m=1, \ldots, z-1$ constitute non-uniformity factors for quantifying the relative deviation of peripheral elements of the rotor with respect to an equally spaced arrangement, a minimum non-uniformity factor $X_{min} = |\min_{m=1, \ldots, z}(x_m)|$ and a maximum non-uniformity factor $X_{max} = \max_{m=1, \ldots, z}(x_m)$ can be found in said arrangement of said z peripheral elements of said second plurality of peripheral elements of the rotor, corresponding to the minimum and maximum possible non-uniformity factors respectively, whereby a $\Delta\alpha_{min} = (1-X_{min})\Delta\alpha^0$ and $\Delta\alpha_{max} = (1+X_{max})\Delta\alpha^0$ may be defined, corresponding to a minimum angular distance and a maximum angular distance respectively that can be found in said distribution of said Z peripheral elements of said second plurality of peripheral elements, so that by dividing the range $\Delta\alpha_{min} - \Delta\alpha_{max}$ into $i=1, 2, 3, \ldots, 10$ intervals having an equal amplitude of $$\delta\alpha = \frac{X_{max} + X_{min}}{10}\Delta\alpha^0$$

the number of angular distances $\Delta\alpha_m$ between contiguous peripheral elements of said second plurality of peripheral elements in the range $I_{th}$, whose amplitude is $\delta\alpha$, ranges from a minimum: $z_i^{min}=\mathrm{int}((z-1)p_i^{min})$ to a maximum: $z_i^{max}=\mathrm{int}((z-1)p_i^{max})+1$ as determined from $p_i^{min}$ and $p_i^{max}$ which are minimum and maximum percentages based on the total number of elements Z of said second plurality of peripheral elements, where int(x) represents an integer part function and:

I) if $X_{max}=X_{min}$ $p_i^{min}$ and $p_i^{max}$ are given by

| | | | $0 < X_{min} < 0.25$ | | $0.25 \le X_{min} < 0.35$ | | $0.35 \le X_{min} < 0.45$ | | $0.45 \le X_{min} < 1$ | |
|---|---|---|---|---|---|---|---|---|---|---|
| i | Range | | $p_i^{min}$ | $p_i^{max}$ | $p_i^{min}$ | $p_i^{max}$ | $p_i^{min}$ | $p_i^{max}$ | $p_i^{min}$ | $p_i^{max}$ |
| 1 | $\Delta\alpha_{min}$ | $\Delta\alpha^0 - 4\delta\alpha$ | 4.6% | 7.2% | 4.6% | 7.2% | 1.5% | 2.4% | 5.8% | 13.8% |
| 2 | $\Delta\alpha^0 - 4\delta\alpha$ | $\Delta\alpha^0 - 3\delta\alpha$ | 12.2% | 19.1% | 7.6% | 12.0% | 4.6% | 7.2% | 1.8% | 7.9% |
| 3 | $\Delta\alpha^0 - 3\delta\alpha$ | $\Delta\alpha^0 - 2\delta\alpha$ | 10.7% | 16.7% | 6.1% | 9.6% | 9.2% | 14.4% | 5.8% | 9.9% |
| 4 | $\Delta\alpha^0 - 2\delta\alpha$ | $\Delta\alpha^0 - \delta\alpha$ | 3.1% | 4.8% | 7.6% | 12.0% | 9.2% | 14.4% | 11.7% | 19.7% |
| 5 | $\Delta\alpha^0 - \delta\alpha$ | $\Delta\alpha^0$ | 10.7% | 16.7% | 10.7% | 16.7% | 10.7% | 16.7% | 13.7% | 21.6% |
| 6 | $\Delta\alpha^0$ | $\Delta\alpha^0 + \delta\alpha$ | 7.6% | 12.0% | 15.3% | 23.9% | 18.4% | 28.7% | 10.7% | 16.7% |
| 7 | $\Delta\alpha^0 + \delta\alpha$ | $\Delta\alpha^0 + 2\delta\alpha$ | 4.6% | 7.2% | 9.2% | 14.4% | 10.7% | 16.7% | 5.8% | 9.9% |
| 8 | $\Delta\alpha^0 + 2\delta\alpha$ | $\Delta\alpha^0 + 3\delta\alpha$ | 6.1% | 9.6% | 3.1% | 4.8% | 6.1% | 9.6% | 1.9% | 7.9% |
| 9 | $\Delta\alpha^0 + 3\delta\alpha$ | $\Delta\alpha^0 + 4\delta\alpha$ | 10.7% | 16.7% | 6.1% | 9.6% | 1.5% | 7.2% | 5.8% | 9.9% |
| 10 | $\Delta\alpha^0 + 4\delta\alpha$ | $\Delta\alpha_{max}$ | 7.6% | 12.0% | 7.6% | 12.0% | 6.1% | 9.6% | 5.8% | 13.8% |

II)

if $X_{max} \neq X_{min}$, with $$X_{max} = \frac{29}{11}X_{min} \quad \text{if} \quad 0 < X_{min} < 0.25$$

$$X_{max} = \frac{7}{3}X_{min} \quad \text{if} \quad 0.25 \le X_{min} < 0.35$$

$$X_{max} = 2X_{min} \quad \text{if} \quad 0.35 \le X_{min} < 0.45$$

$$X_{max} = \frac{8}{5}X_{min} \quad \text{if} \quad 0.45 \le X_{min} < 1$$

$p_i^{min}$ and $p_i^{max}$ are given by

| | | | $0 < X_{min} < 0.25$ | | $0.25 \le X_{min} < 0.35$ | | $0.35 \le X_{min} < 0.45$ | | $0.45 \le X_{min} < 1$ | |
|---|---|---|---|---|---|---|---|---|---|---|
| i | Range | | $p_i^{min}$ | $p_i^{max}$ | $p_i^{min}$ | $p_i^{max}$ | $p_i^{min}$ | $p_i^{max}$ | $p_i^{min}$ | $p_i^{max}$ |
| 1 | $\Delta\alpha_{min}$ | $\Delta\alpha^0 - 4\delta\alpha$ | 17.6% | 29.5% | 15.6% | 29.6% | 15.3% | 23.9% | 9.8% | 17.7% |
| 2 | $\Delta\alpha^0 - 4\delta\alpha$ | $\Delta\alpha^0 - 3\delta\alpha$ | 25.4% | 33.4% | 9.8% | 15.7% | 13.5% | 21.6% | 11.7% | 19.7% |
| 3 | $\Delta\alpha^0 - 3\delta\alpha$ | $\Delta\alpha^0 - 2\delta\alpha$ | 5.8% | 11.8% | 9.8% | 15.7% | 7.8% | 15.7% | 9.8% | 17.7% |
| 4 | $\Delta\alpha^0 - 2\delta\alpha$ | $\Delta\alpha^0 - \delta\alpha$ | 1.8% | 7.9% | 13.6% | 25.5% | 9.8% | 17.7% | 11.7% | 21.6% |
| 5 | $\Delta\alpha^0 - \delta\alpha$ | $\Delta\alpha^0$ | 3.9% | 9.9% | 9.8% | 15.7% | 7.6% | 15.7% | 5.8% | 13.8% |
| 6 | $\Delta\alpha^0$ | $\Delta\alpha^0 + \delta\alpha$ | 3.9% | 9.9% | 5.8% | 11.8% | 9.8% | 19.7% | 5.8% | 11.8% |
| 7 | $\Delta\alpha^0 + \delta\alpha$ | $\Delta\alpha^0 + 2\delta\alpha$ | 9.8% | 15.7% | 1.8% | 7.9% | 1.8% | 7.9% | 9.8% | 17.7% |

-continued

| i | Range | | $0 < X_{min} < 0.25$ $p_i^{min}$ | $p_i^{max}$ | $0.25 \le X_{min} < 0.35$ $p_i^{min}$ | $p_i^{max}$ | $0.35 \le X_{min} < 0.45$ $p_i^{min}$ | $p_i^{max}$ | $0.45 \le X_{min} < 1$ $p_i^{min}$ | $p_i^{max}$ |
|---|---|---|---|---|---|---|---|---|---|---|
| 8 | $\Delta\alpha^0 + 2\delta\alpha$ | $\Delta\alpha^0 + 3\delta\alpha$ | 1.8% | 7.9% | 1.8% | 9.9% | 1.5% | 5.9% | 1.9% | 7.9% |
| 9 | $\Delta\alpha^0 + 3\delta\alpha$ | $\Delta\alpha^0 + 4\delta\alpha$ | 1.8% | 7.9% | 1.8% | 7.9% | 1.5% | 5.9% | 1.5% | 5.9% |
| 10 | $\Delta\alpha^0 + 4\delta\alpha$ | $\Delta\alpha_{max}$ | 1.8% | 5.9% | 1.8% | 9.9% | 1.5% | 5.9% | 1.5% | 5.9% |

or, alternatively, by

| i | Range | | $0 < X_{min} < 0.25$ $p_i^{min}$ | $p_i^{max}$ | $0.25 \le X_{min} < 0.35$ $p_i^{min}$ | $p_i^{max}$ | $0.35 \le X_{min} < 0.45$ $p_i^{min}$ | $p_i^{max}$ | $0.45 \le X_{min} < 1$ $p_i^{min}$ | $p_i^{max}$ |
|---|---|---|---|---|---|---|---|---|---|---|
| 1 | $\Delta\alpha_{min}$ | $\Delta\alpha^0 - 4\delta\alpha$ | 22.7% | 28.3% | 21.4% | 29.6% | 15.3% | 23.9% | 10.7% | 16.7% |
| 2 | $\Delta\alpha^0 - 4\delta\alpha$ | $\Delta\alpha^0 - 3\delta\alpha$ | 26.2% | 32.6% | 9.9% | 13.6% | 13.8% | 21.5% | 12.2% | 19.1% |
| 3 | $\Delta\alpha^0 - 3\delta\alpha$ | $\Delta\alpha^0 - 2\delta\alpha$ | 8.7% | 10.9% | 9.9% | 13.6% | 9.2% | 14.4% | 10.7% | 16.7% |
| 4 | $\Delta\alpha^0 - 2\delta\alpha$ | $\Delta\alpha^0 - \delta\alpha$ | 3.5% | 4.4% | 18.1% | 25.0% | 10.7% | 16.7% | 12.2% | 19.1% |
| 5 | $\Delta\alpha^0 - \delta\alpha$ | $\Delta\alpha^0$ | 7.0% | 8.7% | 9.9% | 13.6% | 7.6% | 12.0% | 7.6% | 12.0% |
| 6 | $\Delta\alpha^0$ | $\Delta\alpha^0 + \delta\alpha$ | 7.0% | 8.7% | 8.2% | 11.4% | 12.2% | 19.1% | 6.1% | 9.6% |
| 7 | $\Delta\alpha^0 + \delta\alpha$ | $\Delta\alpha^0 + 2\delta\alpha$ | 12.2% | 15.2% | 3.3% | 4.5% | 4.6% | 7.2% | 10.7% | 16.7% |
| 8 | $\Delta\alpha^0 + 2\delta\alpha$ | $\Delta\alpha^0 + 3\delta\alpha$ | 1.8% | 4.4% | 1.8% | 4.5% | 1.5% | 4.5% | 1.5% | 4.8% |
| 9 | $\Delta\alpha^0 + 3\delta\alpha$ | $\Delta\alpha^0 + 4\delta\alpha$ | 1.8% | 4.4% | 1.8% | 4.5% | 1.5% | 4.5% | 1.5% | 4.8% |
| 10 | $\Delta\alpha^0 + 4\delta\alpha$ | $\Delta\alpha_{max}$ | 1.8% | 4.0% | 1.8% | 2.3% | 1.5% | 4.5% | 1.3% | 4.8% |

3. The rotor as claimed in claimed in claim 2, wherein said first plurality of peripheral elements and said second plurality of peripheral elements comprise an equal number of peripheral elements.

4. The rotor as claimed in claimed in claim 2, wherein said first plurality of peripheral elements and said second plurality of peripheral elements comprise a different number of peripheral elements.

5. The rotor as claimed in claimed in claim 2, wherein said first plurality of peripheral elements and said second plurality of peripheral elements have different spacing rules.

6. The rotor as claimed in claimed in claim 2, wherein said first plurality of peripheral elements and said second plurality of peripheral elements have equal spacing rules.

7. The rotor as claimed in claim 6, wherein said first plurality of peripheral elements and said second plurality of peripheral elements have the same spacing rule, whereby the positions of the reference elements (with m=1) of each of them are chosen independently, so that the reference elements may be offset by any angle from 0° to 360°; alternatively, they may be offset by an angle other than $\Delta\alpha^0/2$, or other than $(j+1/2)\Delta\alpha^0$, with j assuming any integer value.

8. The rotor as claimed in any of claim 1, wherein said peripheral elements are rotor blades.

9. The fluid working machine comprising a blower, particularly a side channel blower, and an electric motor for driving a rotor of said blower, wherein said blower comprises:

a casing that defines a toroidal chamber having at least one inlet and one outlet for gaseous fluid;

a rotor comprising a plurality of peripheral blades projecting into said toroidal chamber, said rotor being rotatably supported in said casing by a rotating shaft having a first portion projecting out of said casing through a through opening;

a suction duct and a delivery duct, in fluid communication with said inlet and said outlet of said toroidal chamber via suction and discharge manifolds respectively, wherein the peripheral blades of said rotor are arranged in unequally spaced fashion as claimed in claim 1.

10. The rotor as claimed in claimed in claim 4, wherein said first plurality of peripheral elements and said second plurality of peripheral elements differ by one or two peripheral elements.

11. A fluid working machine comprising a blower and an electric motor for driving a rotor of said blower, wherein said blower comprises:

a casing that defines a toroidal chamber having at least one inlet and one outlet for gaseous fluid;

a rotor comprises a plurality of peripheral blades projecting into said toroidal chamber, said rotor is rotatably supported in said casing by a rotating shaft having a first portion projecting out of said casing through a through opening;

a suction duct and a delivery duct, in fluid communication with said inlet and said outlet of said toroidal chamber via suction and discharge manifolds, respectively, wherein the peripheral blades of said rotor are arranged in unequally spaced fashion as claimed in claim 2.

12. The fluid working machine as claimed in claimed in claim 11, wherein the blower comprises a side channel blower.

* * * * *